(12) United States Patent
Eguchi et al.

(10) Patent No.: US 9,804,300 B2
(45) Date of Patent: Oct. 31, 2017

(54) ANTI-GLARE FILM, POLARIZER, LIQUID-CRYSTAL PANEL, AND IMAGE DISPLAY DEVICE

(71) Applicant: Dai Nippon Printing Co., Ltd., Tokyo (JP)

(72) Inventors: Junya Eguchi, Tokyo (JP); Teppei Sotoda, Tokyo (JP); Shoichiro Ogumi, Tokyo (JP); Kousuke Matsuyama, Tokyo (JP); Gen Furui, Tokyo (JP)

(73) Assignee: Dai Nippon Printing Co., Ltd., Shinjuku-Ku (JP)

( * ) Notice: Subject to any disclaimer, the term of this patent is extended or adjusted under 35 U.S.C. 154(b) by 0 days.

(21) Appl. No.: 14/901,837

(22) PCT Filed: Jun. 19, 2014

(86) PCT No.: PCT/JP2014/066251
§ 371 (c)(1),
(2) Date: Dec. 29, 2015

(87) PCT Pub. No.: WO2015/001966
PCT Pub. Date: Jan. 8, 2015

(65) Prior Publication Data
US 2016/0195642 A1    Jul. 7, 2016

(30) Foreign Application Priority Data

Jul. 5, 2013  (JP) ................................. 2013-142012
Jul. 19, 2013 (JP) ................................. 2013-150873

(51) Int. Cl.
*G02B 1/118* (2015.01)
*B32B 7/02* (2006.01)
(Continued)

(52) U.S. Cl.
CPC ................ *G02B 1/118* (2013.01); *B32B 7/02* (2013.01); *G02B 5/0294* (2013.01); *G02B 5/305* (2013.01);
(Continued)

(58) Field of Classification Search
USPC .................................................. 359/599, 601
See application file for complete search history.

(56) References Cited

U.S. PATENT DOCUMENTS

2002/0085284 A1    7/2002  Nakamura et al.
2007/0253064 A1   11/2007  Ookubo et al.
(Continued)

FOREIGN PATENT DOCUMENTS

CN    101779146 A    7/2010
CN    102004278 A    4/2011
(Continued)

OTHER PUBLICATIONS

International Search Report (Application No. PCT/JP2014/066251) dated Aug. 26, 2014.
(Continued)

*Primary Examiner* — Darryl J Collins
*Assistant Examiner* — Journey Sumlar
(74) *Attorney, Agent, or Firm* — Burr & Brown, PLLC

(57) ABSTRACT

An antiglare film, including: a light transmissive substrate; and an antiglare layer that is disposed on a light transmissive substrate and includes a concavo-convex surface, wherein a surface of the antiglare film is a concavo-convex surface; the antiglare film has a total haze value of 0% or more and 5% or less; the antiglare film has an internal haze value of 0% or more and 5% or less; and assuming that a transmission image sharpness of the antiglare film, measured using an optical comb with a width of 0.125 mm, is C (0.125), and that a transmission image sharpness of the antiglare film,
(Continued)

measured using an optical comb with a width of 0.25 mm, is C (0.25), an expression (1) and an expression (2) described below are satisfied:

$$C(0.25) - C(0.125) \geq 2\% \quad (1); \text{ and}$$

$$C(0.125) \geq 65\% \quad (2).$$

13 Claims, 7 Drawing Sheets

(51) Int. Cl.
  *G02B 5/30* (2006.01)
  *G02F 1/1335* (2006.01)
  *G02B 5/02* (2006.01)
  *G02B 1/111* (2015.01)

(52) U.S. Cl.
  CPC ..... *G02B 5/3033* (2013.01); *G02F 1/133502* (2013.01); *B32B 2307/412* (2013.01); *B32B 2307/42* (2013.01); *G02B 1/111* (2013.01)

(56) References Cited

U.S. PATENT DOCUMENTS

| | | | |
|---|---|---|---|
| 2010/0296169 A1* | 11/2010 | Mizuno | C09D 4/00 359/599 |
| 2011/0051052 A1* | 3/2011 | Tasaka | C09B 31/043 349/96 |
| 2012/0002282 A1 | 1/2012 | Nagahama et al. | |
| 2012/0141736 A1 | 6/2012 | Hotta et al. | |
| 2014/0254020 A1 | 9/2014 | Sakajiri et al. | |
| 2014/0254021 A1* | 9/2014 | Furui | B32B 7/02 359/609 |
| 2014/0340755 A1 | 11/2014 | Eguchi et al. | |
| 2016/0245955 A1 | 8/2016 | Eguchi et al. | |

FOREIGN PATENT DOCUMENTS

| | | |
|---|---|---|
| JP | 2005-099778 A1 | 4/2005 |
| JP | 2008-040064 A1 | 2/2008 |
| JP | 2008-046497 A1 | 2/2008 |
| JP | 2010-020267 A1 | 1/2010 |
| JP | 2010-102186 A1 | 5/2010 |
| JP | 2010-269504 A1 | 12/2010 |
| JP | 2011-048310 A1 | 3/2011 |
| JP | 2013-037362 A | 2/2013 |
| JP | 2013-083914 A | 5/2013 |
| JP | 2015-014735 A | 1/2015 |
| JP | 5924311 B | 5/2016 |
| KR | 10-2013-0018117 | 2/2013 |
| TW | 201248212 A | 12/2012 |
| TW | 201300821 A | 1/2013 |
| TW | 201316045 A1 | 4/2013 |
| TW | I461749 B | 11/2014 |
| WO | 2010/113827 A1 | 10/2010 |
| WO | 2013/054805 | 4/2013 |
| WO | 2013/099931 A1 | 7/2013 |

OTHER PUBLICATIONS

Japanese Office Action (Application No. 2013-142012) dated May 19, 2015 (with JPO Machine Translation).
Japanese Office Action (Application No. 2013-142012) dated Sep. 25, 2015 (with JPO Machine Translation).
Japanese Office Action (Application No. 2013-150873) dated Feb. 24, 2015 (with JPO Machine Translation).
Japanese Office Action (Application No. 2013-150873) dated Jun. 2, 2015 (with JPO Machine Translation).
Japanese Office Action (Trial No. 2015-14178; Application No. 2013-150873) dated Oct. 16, 2015 (with English Translation).
Korean Office Action (with English translation), Korean Application No. 10-2015-7024647, dated Aug. 23, 2016 (10 pages).
Korean Office Action (and translation provided by foreign counsel) from a corresponding Korean patent application (KR 10-2015-7024647) bearing a mailing date of Dec. 30, 2016, 11 pages.
Taiwan Office Action from a corresponding Taiwan patent application (TW105113106) bearing a mailing date of Jan. 25, 2017, 3 pages.
Chinese Office Action (Application No. 201480031004.4) dated Nov. 21, 2016 (with English translation).
Japanese Office Action (with English translation), Japanese Application No. 2015-254299, dated Mar. 10, 2017 (7 pages).
Chinese Office Action (Application No. 201480031004.4) dated May 17, 2017 (with English translation).
Chinese Office Action dated Aug. 7, 2017 from corresponding Chinese Patent Application No. 201610353185.3.

* cited by examiner

ANTI-GLARE FILM, POLARIZER, LIQUID-CRYSTAL PANEL, AND IMAGE DISPLAY DEVICE

TECHNICAL FIELD

The present invention relates to antiglare films, polarizing plates, liquid crystal panels, and image display apparatuses.

BACKGROUND ART

For suppressing reflections of an observer, the background of the observer, and the like, an antiglare film having concavities and convexities on a surface thereof or an antireflection film having an antireflection layer on an outermost surface thereof is generally disposed on an image display surface in an image display apparatus such as a liquid crystal display (LCD), a cathode ray tube display (CRT), a plasma display (PDP), an electroluminescence display (ELD), or a field emission display (FED).

The antiglare film allows extraneous light to scatter on the concavo-convex surface of an antiglare layer, whereby reflections of an observer, the background of the observer, and the like are suppressed. The antiglare film mainly includes a light transmissive substrate; and an antiglare layer that is disposed on the light transmissive substrate and has a concavo-convex surface.

The antiglare layer generally includes a binder resin; and organic fine particles, existing in the binder resin, for forming the concavo-convex surface.

However, there is a fear that image light scatters due to the concavo-convex surface of an antiglare layer, whereby so-called glare is generated, in a case in which such an antiglare film is placed on a surface of an image display apparatus. Against such a problem, enhancing the internal haze of an antiglare film, to suppress glare, is proposed (for example, see Japanese Patent Laid-Open No. 2010-102186).

On the other hand, in recent years, super-high-definition image display apparatuses having 3000 or more horizontal pixels, called 4K2K (3840 (the number of horizontal pixels)×2160 (the number of vertical pixels)), have been developed.

Like the image display apparatus described above, an antiglare film is also disposed on an image display surface in such a super-high-definition image display apparatus. However, further luminance and light transmissiveness are demanded in the super-high-definition image display apparatus. Because enhancement of the total haze or internal haze of the antiglare film results in reduction in luminance and light transmittance, it is impossible to adopt, as means for suppressing glare, means of enhancing the internal haze of the antiglare film as described above in the super-high-definition image display apparatus. There is a fear that the enhancement of the internal haze of the antiglare film results in diffusion of image light in the antiglare film, whereby part of image light becomes stray light. As a result, there is also a fear that a dark room contrast is reduced, and an image blurs. Thus, an antiglare film which is capable of suppressing glare and has a low total haze and a low internal haze is currently desired as an antiglare film incorporated into a super-high-definition image display apparatus.

Furthermore, currently, an antiglare film which has a low total haze and a low internal haze and is capable of suppressing glare and of blurring the contour of a reflected image (for example, an observer, or the background of the observer) is also desired as an antiglare film incorporated into a super-high-definition image display apparatus.

SUMMARY OF INVENTION

Technical Problem

The present invention was accomplished to solve the above-described problems. That is, the present invention is aimed at providing an antiglare film which is capable of suppressing glare and has a low total haze and a low internal haze; an antiglare film which has a low total haze and a low internal haze and is capable of suppressing glare and of blurring the contour of a reflected image; a polarizing plate; a liquid crystal panel; and an image display apparatus.

Solution to Problem

In accordance with one aspect of the present invention, an antiglare film includes: a light transmissive substrate; and an antiglare layer that is disposed on the light transmissive substrate and includes a concavo-convex surface, wherein a surface of the antiglare film is a concavo-convex surface; the antiglare film has a total haze value of 0% or more and 5% or less; the antiglare film has an internal haze value of 0% or more and 5% or less; and assuming that a transmission image sharpness of the antiglare film, measured using an optical comb with a width of 0.125 mm, is C (0.125), and that a transmission image sharpness of the antiglare film, measured using an optical comb with a width of 0.25 mm, is C (0.25), an expression (1) and an expression (2) described below are satisfied:

$$C(0.25)-C(0.125) \geq 2\% \quad (1); \text{ and}$$

$$C(0.125) \geq 65\% \quad (2).$$

In accordance with another aspect of the present invention, there is provided an antiglare film, including: a light transmissive substrate; and an antiglare layer that is disposed on the light transmissive substrate and includes a concavo-convex surface, wherein a surface of the antiglare film is a concavo-convex surface; the antiglare film has a total haze value of 0% or more and 5% or less; the antiglare film has an internal haze value of 0% or more and 5% or less; and assuming that the surface of the antiglare film has an arithmetic mean roughness of Ra (100) [μm] at a long wavelength cutoff wavelength of 100 μm and that the surface of the antiglare film has an arithmetic mean roughness of Ra (100-1000) [μm] at a short wavelength cutoff wavelength of 100 μm and at a long wavelength cutoff wavelength of 1000 μm, an expression (3) and an expression (4) described below are satisfied:

$$Ra(100)/Ra(100-1000) \leq 0.5 \quad (3); \text{ and}$$

$$0.04\ \mu m \leq Ra(100-1000) \leq 0.12\ \mu m \quad (4).$$

In accordance with another aspect of the present invention, there is provided a polarizing plate, including: the antiglare film; and a polarizing element formed on a surface opposite to a surface, on which the antiglare layer is formed, of the light transmissive substrate of the antiglare film.

In accordance with another aspect of the present invention, there is provided a liquid crystal display panel, including the antiglare film or the polarizing plate.

In accordance with another aspect of the present invention, an image display apparatus, including the antiglare film or the polarizing plate, and including 3000 or more horizontal pixels.

Advantageous Effects of Invention

According to the antiglare film of the one aspect of the present invention, and the polarizing plate, the liquid crystal panel, and the image display apparatus of the other aspects of the present invention, the antiglare film which is capable of suppressing glare and has a low total haze and a low internal haze, the polarizing plate, the liquid crystal panel, and the image display apparatus can be provided because the antiglare film has a total haze value of 0% or more and 5% or less, the antiglare film has an internal haze value of 0% or more and 5% or less, and assuming that a transmission image sharpness of the antiglare film, measured using an optical comb with a width of 0.125 mm, is C (0.125), and that a transmission image sharpness of the antiglare film, measured using an optical comb with a width of 0.25 mm, is C (0.25), the expression (1) and expression (2) described above are satisfied.

According to the antiglare film of another aspect of the present invention, and the polarizing plate, the liquid crystal panel, and the image display apparatus of other aspects, the antiglare film which has a low total haze and a low internal haze and is capable of suppressing glare and of blurring the contour of a reflected image, the polarizing plate, the liquid crystal panel, and the image display apparatus can be provided because the antiglare film has a total haze value of 0% or more and 5% or less, the antiglare film has an internal haze value of 0% or more and 5% or less, and assuming that the surface of the antiglare film has an arithmetic mean roughness of Ra (100) [µm] at a long wavelength cutoff wavelength of 100 µm and that the surface of the antiglare film has an arithmetic mean roughness of Ra (100-1000) [µm] at a short wavelength cutoff wavelength of 100 µm and at a long wavelength cutoff wavelength of 1000 µm, the expression (3) and expression (4) described above are satisfied.

DESCRIPTION OF EMBODIMENTS

First Embodiment

Figure 1:
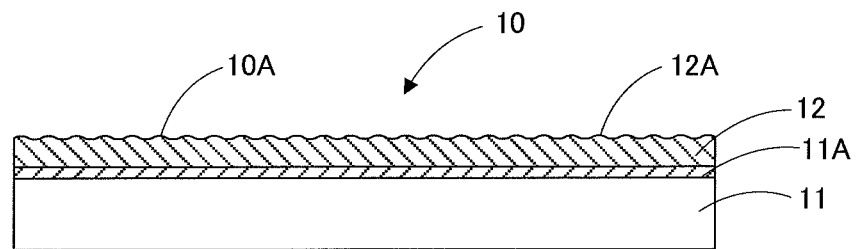
FIG. 1 is a schematic view illustrating the configuration of an antiglare film according to a first embodiment.
Figure 2:
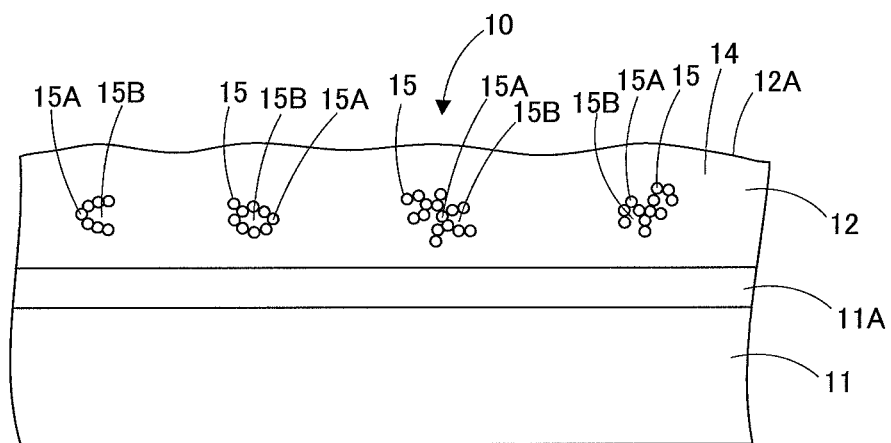
FIG. 2 is a view of an enlarged part of FIG. 1.
Figure 3:
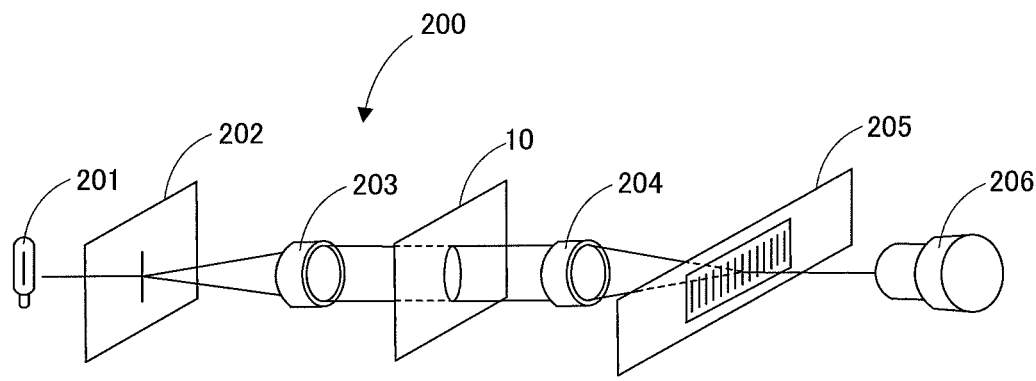
FIG. 3 is a schematic view illustrating the state of measuring the transmission image sharpness of the antiglare film according to the first embodiment with a transmission image sharpness measurement apparatus.

An antiglare film according to the first embodiment of the present invention will be described below with reference to the drawings. FIG. 1 is a schematic view illustrating the configuration of the antiglare film according to the present embodiment, FIG. 2 is a view of an enlarged part of FIG. 1, and FIG. 3 is a schematic view illustrating the state of measuring the transmission image sharpness of the antiglare film according to the present embodiment with a transmission image sharpness measurement apparatus. As used herein, the terms "film", "sheet", "plate", and the like are based only on differences in names and not distinguished from each other. Thus, for example, "film" is a concept encompassing a member that can also be called a sheet or a plate. As one specific example, "antiglare film" also encompasses a member called "antiglare sheet", "antiglare plate", or the like.

<<Antiglare Film>>

As illustrated in FIG. 1, the antiglare film 10 includes a light transmissive substrate 11 and an antiglare layer 12 that is disposed on the light transmissive substrate 11 and has a concavo-convex surface 12A. In the antiglare film 10, it is preferable to form a mixture region 11A, in which the light transmissive substrate 11 is mixed with a resin containing as a monomer unit a photopolymerizable monomer having a weight average molecular weight of 1000 or less in the vicinity of the interface between the light transmissive substrate 11 and the antiglare layer 12, as illustrated in FIG. 1. As used herein, "weight average molecular weight" is a value obtained by dissolution in a solvent such as tetrahydrofuran (THF), and by polystyrene conversion by a gel permeation chromatography (GPC) method known in the art.

A surface 10A of the antiglare film 10 is a concavo-convex surface. In the present embodiment, the concavo-convex surface 12A of the antiglare layer 12 is the surface 10A of the antiglare film 10 because a functional layer such as a low-refractive-index layer is not disposed on the antiglare layer 12. As used herein, "functional layer" refers to a layer intended to exert some kind of function in an antiglare film, and specific examples thereof include layers for exerting functions such as anti-reflecting properties, antistatic properties, and antifouling properties. The functional layer may be not only a single layer but also a layer in which two or more layers are layered.

The antiglare film 10 has a total haze value of 0% or more and 5% or less and an internal haze value of 0% or more and 5% or less. The total haze value and the internal haze value are values measured for the entire antiglare film. For example, in the present embodiment, the total haze value and internal haze value of the antiglare film 10 are values measured using the antiglare film 10 including the light transmissive substrate 11 and the antiglare layer 12 because a functional layer such as a low-refractive-index layer is not disposed on the antiglare layer 12. For example, when a functional layer such as a low-refractive-index layer is disposed on an antiglare layer in a manner similar to that in a second embodiment, the total haze value and internal haze value of an antiglare film are values measured using the antiglare film including a light transmissive substrate, the antiglare layer, and the functional layer.

The total haze value and the internal haze value can be measured by a method according to JIS K7136 using a haze meter (HM-150, manufactured by MURAKAMI COLOR RESEARCH LABORATORY). Specifically, the total haze value of the antiglare film is measured according to JIS K7136 using the haze meter. Then, a triacetylcellulose substrate (TD60UL, manufactured by FUJIFILM Corporation) is affixed to the surface of the antiglare film via a transparent optical adhesive layer. As a result, the concavo-convex geometry of the surface of the antiglare film is deformed, whereby the surface of the antiglare film becomes flat. In this state, the internal haze value is determined by measuring a haze value according to JIS K7136 using the haze meter (HM-150, manufactured by MURAKAMI COLOR RESEARCH LABORATORY). In the internal haze, the concavo-convex geometry of the surface in the antiglare film is not taken into consideration.

The antiglare film 10 preferably has a total haze value of 1% or less, more preferably 0.3% or more and 0.5% or less. It is preferable that the internal haze value thereof is substantially 0%. The phrase "internal haze value is substantially 0%" is not limited to a case in which the internal haze value is completely 0% but has a meaning including a range in which the internal haze value can be regarded as approximately 0%, within a measurement error even in a case in which the internal haze value is more than 0% (for example, internal haze value of 0.3% or less).

When the antiglare film 10 has a total haze value of 0% or more and 5% or less and an internal haze value of 0% or more and 5% or less, the antiglare film 10 has a surface haze value of 0% or more and 5% or less. The antiglare film 10 preferably has a surface haze value of 0% or more and 1% or less, more preferably 0% or more and 0.3% or less. The surface haze value is caused only by the concavo-convex geometry of the surface of the antiglare film. The surface haze value caused only by the concavo-convex geometry of the surface of the antiglare film is determined by subtracting the internal haze value from the total haze value.

In the antiglare film 10, assuming that the transmission image sharpness of the antiglare film 10, measured using an optical comb with a width of 0.125 mm, is C (0.125), and that the transmission image sharpness of the antiglare film 10, measured using an optical comb with a width of 0.25 mm, is C (0.25), expressions (1) and (2) described below are satisfied:

$$C(0.25) - C(0.125) \geq 2\% \quad (1); \text{ and}$$

$$C(0.125) \geq 65\% \quad (2).$$

The phrase "transmission image sharpness of antiglare film" means a transmission image sharpness measured for an entire antiglare film. In the present embodiment, the transmission image sharpness of the antiglare film 10 is a transmission image sharpness measured using the antiglare film 10 including the light transmissive substrate 11 and the antiglare layer 12 because a functional layer such as a low-refractive-index layer is not disposed on the antiglare layer 12. For example, when a functional layer such as a low-refractive-index layer is disposed on an antiglare layer in a manner similar to that in the second embodiment, the transmission image sharpness of an antiglare film is a transmission image sharpness measured using the antiglare film including a light transmissive substrate, the antiglare layer, and the functional layer.

The reason that it is necessary to satisfy the above-described expressions (1) and (2) in the antiglare film in the present invention is as follows. First, in the antiglare film, the concavo-convex geometry is formed on the surface of the antiglare layer in order to obtain antiglare properties, and the concavities and convexities of the concavo-convex geometry may act like lenses (lens effect). It is considered that when such a lens effect occurs, a black matrix which partitions the pixels of a liquid crystal display or the like, or transmitted light from the pixels is randomly emphasized, whereby glare is caused. It is considered that an antiglare film having a low transmission image sharpness tends to have more concavities and convexities acting as lenses and to have more deteriorated glare than an antiglare film having a high transmission image sharpness. As a result of repeating extensive research in this respect by the present inventors, it was found that, specifically, a value of C (0.125) of less than 65% results in excessively increased concavities and convexities acting as lenses, whereby glare is deteriorated. As a result of further repeating extensive research, the present inventors found that an antiglare film having a small difference between a value of C (0.25) and a value of C (0.125) tends to have a larger lens effect and more deteriorated glare than an antiglare film having a large difference between a value of C (0.25) and a value of C (0.125), although the reason thereof is unclear. Specifically, a lens effect is excessively increased, and glare is deteriorated when a difference between a value of C (0.25) and a value of C (0.125) is less than 2%. Thus, it is considered that it is necessary that the above-described expressions (1) and (2) are satisfied in the antiglare film. Those skilled in the art ordinarily estimate that a less difference between a value of C (0.25) and a value of C (0.125) is better from the viewpoint of suppressing glare, and glare is deteriorated when the difference is large. This is also proved, for example, by Japanese Patent Laid-Open No. 2010-269504. This publication describes that a ratio between a transmission image sharpness in the case of using an optical comb of 0.125 mm and a transmission image sharpness in the case of using an optical comb of 2.0 mm is 0.70 or more from the viewpoint of suppressing glare, and the ratio is preferably 0.80 or more and 0.93 or less. In other words, the publication provides a direction that the less difference between the transmission image sharpness in the case of using the optical comb of 0.125 mm and the transmission image sharpness in the case of using the optical comb of 2.0 mm is preferable, because the publication describes that the above-described ratio is more preferably 0.80 or more than 0.70 or more, although an optical comb of 0.25 mm is not used. In contrast to this estimation, a difference between a value of C (0.25) and a value of C (0.125) is set at 2% or more in order to suppress glare in the present invention. Thus, it may be considered that the antiglare film which satisfies the above (1) and (2) is beyond the scope that can be anticipated in light of the technological level of a conventional antiglare film.

A difference between a value of C (0.25) and a value of C (0.125) is preferably 3% or more, more preferably 4% or more. The difference between the value of C (0.25) and the value of C (0.125) is preferably 10% or less, more preferably 7% or less, in view of securing antiglare properties. It is preferable that the value of C (0.125) is 75% or more. The value of C (0.125) is preferably 90% or less, more preferably 85% or less, still more preferably 80% or less, in view of securing antiglare properties.

The above-described transmission image sharpness can be measured by a transmission image sharpness measurement apparatus according to a transmission method for image sharpness in JIS K7374. Examples of such a measurement apparatus include an image clarity measuring device ICM-1T manufactured by Suga Test Instruments Co., Ltd.

As illustrated in FIG. 3, a transmission image sharpness measurement apparatus 200 includes a light source 201, a slit 202, a lens 203, a lens 204, an optical comb 205, and a photoreceiver 206. In the transmission sharpness measurement apparatus 200, light that is emitted from the light source 201 and passes through the slit 202 is allowed to be parallel light through the lens 203, a side, closer to the light transmissive substrate 11, of the antiglare film 10 is irradiated with the parallel light, light transmitted from the concavo-convex surface 12A of the antiglare layer 12 of the antiglare film 10 is condensed through the lens 204, and light passing through the optical comb 205 is received by the photoreceiver 206. On the basis of the amount of the light received by the photoreceiver 206, a transmission image sharpness C is calculated from the following expression (5):

$$C(n)=\{(M-m)/(M+m)\}\times 100 (\%) \qquad (5).$$

In the expression (5), C (n) is a transmission image sharpness (%) in the case of the width n (mm) of an optical comb, M is a maximum light amount in the case of the width n (mm) of the optical comb, and m is a minimum light amount in the case of the width n (mm) of the optical comb.

The optical comb 205 can be moved along the longitudinal direction of the optical comb 205 and includes a light shield portion and a transmission portion. The ratio of the widths of the light shield portion and the transmission portion in the optical comb 205 is 1:1. In JIS K7374, five optical combs having widths of 0.125 mm, 0.25 mm, 0.5 mm, 1.0 mm, and 2.0 mm are specified as optical combs.

<Light Transmissive Substrate>

The light transmissive substrate 11 is not particularly limited as long as the substrate has light transmissiveness but examples thereof include cellulose acylate substrates, cycloolefin polymer substrates, polycarbonate substrates, acrylate-based polymer substrates, polyester substrates, or glass substrates.

Examples of the cellulose acylate substrates include cellulose triacetate substrates and cellulose diacetate substrates. Examples of the cycloolefin polymer substrates include substrates including polymers of norbornene-based monomers, monocyclic cycloolefin monomers, and the like.

Examples of the polycarbonate substrates include aromatic polycarbonate substrates based on bisphenols (such as bisphenol A) and aliphatic polycarbonate substrates based on diethylene glycol bis(allyl carbonate) and the like.

Examples of the acrylate-based polymer substrates include poly(methyl (meth)acrylate) substrates, poly(ethyl (meth)acrylate) substrates, methyl (meth)acrylate-butyl (meth)acrylate copolymer substrates, and the like.

Examples of the polyester substrates include a substrate containing as a constituent at least one of polyethylene terephthalate, polypropylene terephthalate, polybutylene terephthalate, and polyethylene naphthalate; and the like.

Examples of the glass substrates include glass substrates based on soda lime silica glass, borosilicate glass, alkali-free glass, and the like.

The cellulose acylate substrates are preferred among them because of having excellent retardation and being easily adhered to polarizers, and triacetylcellulose substrates (TAC substrates) are further preferred among the cellulose acylate substrates. Such a triacetylcellulose substrate is a light transmissive substrate that can have an average light transmittance of 50% or more in a visible light region of 380 to 780 nm. The triacetylcellulose substrate preferably has an average light transmittance of 70% or more, still more preferably 85% or more.

The triacetylcellulose substrate may also be a substance, in which a constituent other than acetic acid is also combined as a fatty acid with which cellulose is esterified, such as cellulose acetate propionate or cellulose acetate butyrate, other than pure triacetylcellulose. Further, other cellulose lower fatty acid esters such as diacetyl cellulose or various additives such as plasticizers, ultraviolet absorbing agents, and lubricants may also be optionally added to such triacetylcelluloses.

The cycloolefin polymer substrates are preferred in view of excellent retardation and heat resistance, and the polyester substrates are preferred in view of mechanical characteristics and heat resistance.

The thickness of the light transmissive substrate 11 is not particularly limited but can be 5 μm or more and 1000 μm or less. The lower limit of the thickness of the light transmissive substrate 11 is preferably 15 μm or more, more preferably 25 μm or more, from the viewpoint of handleability and the like. The upper limit of the thickness of the light transmissive substrate 11 is preferably 80 μm or less from the viewpoint of thinning.

<Mixture Region>

The mixture region 11A is a region, in which the light transmissive substrate 11 is mixed with a resin containing as a monomer unit a photopolymerizable monomer having a weight average molecular weight of 1000 or less, as mentioned above. The photopolymerizable monomer is the same as a photopolymerizable monomer having a weight average molecular weight of 1000 or less contained as a monomer unit in a binder resin 14, described below, of the antiglare layer 12.

The thickness of the mixture region 11A is preferably 0.01 μm or more and 1 μm or less. In accordance with this embodiment, interference fringes can be sufficiently suppressed from being generated by the concavo-convex surface 12A, described below, of the antiglare layer 12. Therefore, interference fringes can be suppressed from being generated even when the thickness of the mixture region 11A is small in such a case. Because the thickness of a mixture region formed with a conventional antireflection film is 3 μm or more, the thickness of the mixture region 11A may be considered to be sufficiently small in comparison with that of the mixture region formed with the conventional antireflection film. Further, the formation of the mixture region 11A can cause adhesiveness between the light transmissive substrate 11 and the antiglare layer 12 to be more improved. Because interference fringes can be sufficiently suppressed from being generated by the concavo-convex surface 12A of the antiglare layer 12 as described above, it is not necessary to form such a mixture region 11A on the antiglare film 10. Because interference fringes can be suppressed from being generated even when any mixture region is not formed as described above, for example, even a substrate, on which it is difficult to form a mixture region, such as an acrylic substrate, a cycloolefin polymer substrate, or a polyester substrate, may be used as the light transmissive substrate.

<Antiglare Layer>

The antiglare layer 12 is a layer that exerts an antiglare property. The antiglare layer 12 exerts the antiglare property and may exert another function. Specifically, the antiglare layer 12 may be a layer that exerts the antiglare property and exerts, for example, a function such as a hard coat property, an anti-reflecting property, an antistatic property, or an antifouling property.

When the antiglare layer 12 is a layer that exerts a hard coat property as well as an antiglare property, the antiglare layer 12 has a hardness of "H" or more on the pencil hardness test (load of 4.9 N) defined in JIS K5600-5-4 (1999).

The surface of the antiglare layer 12 is the concavo-convex surface 12A as described above. "Surface of antiglare layer" means a surface opposite to a surface, closer to the light transmissive substrate, of the antiglare layer (back surface of antiglare layer).

When an internal haze value is in a range of 0% or more and 5% or less, a transmission image sharpness is influenced by the concavo-convex geometry of the surface of the antiglare film because the internal haze value has no influence on the transmission image sharpness. In contrast, the surface 10A of the antiglare film 10 is the concavo-convex surface 12A of the antiglare layer 12 in the present embodiment. Thus, in the present embodiment, whether the transmission image sharpness of antiglare film 10 satisfies the expression (1) and expression (2) described above depends on the concavo-convex geometry of the concavo-convex surface 12A of the antiglare layer 12. Hereinafter, the concavo-convex surface of such an antiglare layer that an antiglare film satisfies the expression (1) and expression (2) described above is referred to as "specific concavo-convex surface" in the present embodiment.

The specific concavo-convex surface can be formed by appropriately adjusting the number of concavities and convexities, the sizes of concavities and convexities, the angles of the inclinations of concavities and convexities, or the like. Examples of adjustment methods thereof include (A) a method for forming a concavo-convex surface using a composition for an antiglare layer, containing a photopolymerizable compound which becomes a binder resin after cured, and fine particles, (B) a method for forming a concavo-convex surface by a transfer method using a die, (C) a method for forming a concavo-convex surface by roughening the surface of the antiglare layer by sandblast, or (D) a method for forming a concavo-convex surface by applying concavities and convexities onto the surface of an antiglare layer by an emboss roll. Of these, the above-described method (A) is preferred because production is easy.

In the above-described method (A), when the photopolymerizable compound is polymerized (crosslinked) to become the binder resin, shrinkage as a whole occurs because the photopolymerizable compound effects shrinkage on curing in a portion in which any fine particles are not present. In contrast, only the photopolymerizable compound existing above or below the fine particles effects shrinkage on curing because the fine particles do not effect shrinkage on curing in a portion in which the fine particles are present. As a result, the film thickness of the antiglare layer in the portion in which the fine particles are present is larger than that in the portion in which any fine particles are not present and, therefore, the surface of the antiglare layer has a concavo-convex geometry. Thus, the antiglare layer having the specific concavo-convex surface can be formed by appropriately selecting the kind and particle diameters of the fine particles and the kind of the photopolymerizable compound to adjust film formation conditions.

The antiglare layer 12 includes the binder resin 14 and fine particles 15 as illustrated in FIG. 2, and is formed by the above-described method (A).

(Binder Resin)

The binder resin includes a polymerization product (crosslinked substance) of a photopolymerizable compound. The binder resin may include a solvent drying type resin and a thermosetting resin as well as the polymerization product (crosslinked substance) of the photopolymerizable compound. The photopolymerizable compound has at least one photopolymerizable functional group. As used herein, "photopolymerizable functional group" refers to a functional group which can be polymerized by light irradiation. Examples of the photopolymerizable functional group include groups having an ethylenic double bond, such as (meth)acryloyl groups, vinyl groups, and allyl groups. The term "(meth)acryloyl groups" means both of "acryloyl group" and "methacryloyl group". Examples of light that is irradiated when the photopolymerizable compound is polymerized include visible light rays and ionizing radiations such as ultraviolet rays, X-rays, electron rays, α-rays, β-rays, and γ-rays.

Examples of the photopolymerizable compound include photopolymerizable monomers, photopolymerizable oligomers, or photopolymerizable polymers, which may be appropriately adjusted to be used. As the photopolymerizable compound, a combination of a photopolymerizable monomer with a photopolymerizable oligomer or a photopolymerizable polymer is preferred. When the mixture region 11A is formed, at least a photopolymerizable monomer is allowed to be contained as the photopolymerizable compound.

Photopolymerizable Monomer

A photopolymerizable monomer has a weight average molecular weight of 1000 or less. A weight average molecular weight of the photopolymerizable monomer of 1000 or less enables the photopolymerizable monomer to permeate the light transmissive substrate 11 with a solvent permeating the light transmissive substrate 11. As a result, the mixture region 11A, in which the light transmissive substrate 11 is mixed with a resin containing the photopolymerizable monomer as a monomer unit, for reducing a refractive index between the light transmissive substrate 11 and the antiglare layer 12 can be formed in the vicinity of the interface of the antiglare layer 12 in the light transmissive substrate 11. Not only one kind but also a plurality of kinds of such photopolymerizable monomers may be used.

As the photopolymerizable monomer, a polyfunctional monomer having two (i.e., bifunctional) or more photopolymerizable functional groups is preferred.

Examples of bi- or multi-functional monomers include trimethylolpropane tri(meth)acrylate, tripropylene glycol di(meth)acrylate, diethylene glycol di(meth)acrylate, dipropylene glycol di(meth)acrylate, pentaerythritol tri(meth)acrylate, pentaerythritol tetra(meth)acrylate, dipentaerythritol hexa(meth)acrylate, 1,6-hexanediol di(meth)acrylate, neopentyl glycol di(meth)acrylate, tri methylolpropane tri (meth)acrylate, ditrimethylolpropane tetra(meth)acrylate, dipentaerythritol penta(meth)acrylate, tripentaerythritol octa (meth)acrylate, tetrapentaerythritol deca(meth)acrylate, isocyanuric acid tri(meth)acrylate, isocyanuric acid di(meth) acrylate, polyester tri(meth)acrylate, polyester di(meth) acrylate, bisphenol di(meth)acrylate, diglycerol tetra(meth) acrylate, adamanthyl di(meth)acrylate, isobornyl di(meth) acrylate, dicyclopentane di(meth)acrylate, tricyclodecane di(meth)acrylate, and ditrimethylolpropane tetra(meth)acrylate, and monomers obtained by modifying them with PO, EO, and the like.

Among them, pentaerythritol triacrylate (PETA), dipentaerythritol hexaacrylate (DPHA), pentaerythritol tetraacrylate (PETTA), dipentaerythritol pentaacrylate (DPPA), and the like are preferred from the viewpoint of obtaining an antiglare layer having high hardness.

Photopolymerizable Oligomer

A photopolymerizable oligomer has a weight average molecular weight of more than 1000 and 10000 or less. As such photopolymerizable oligomers, polyfunctional oligomers having three (trifunctional) or more photopolymerizable functional groups are preferred. As such photopolymerizable oligomers, bi- or multi-functional polyfunctional oligomers are preferred. Examples of the polyfunctional oligomers include polyester (meth)acrylates, urethane (meth)acrylates, polyester-urethane (meth)acrylates, polyether (meth)acrylates, polyol (meth)acrylates, melamine (meth)acrylates, isocyanurate (meth)acrylates, epoxy (meth)acrylates, and the like.

Photopolymerizable Polymer

A photopolymerizable polymer has a weight average molecular weight of more than 10000, and the weight average molecular weight is preferably 10000 or more and 80000 or less, more preferably 10000 or more and 40000 or less. When the weight average molecular weight is more than 80000, coating suitability might be deteriorated due to high viscosity to deteriorate the appearance of an obtained antiglare film. Examples of the above-described polyfunctional polymer include urethane (meth)acrylates, isocyanurate (meth)acrylates, polyester-urethane (meth)acrylates, epoxy (meth)acrylates, and the like.

The solvent drying type resin is such a resin as to become a coating only by drying a solvent added to adjust a solid content during coating. Examples of such resins include thermoplastic resins. In the case of adding the solvent drying type resin, any defect in a coating on a surface coated with a coating fluid can be effectively prevented when the antiglare layer 12 is formed. As the solvent drying type resin, without particular limitation, a thermoplastic resin can be typically used.

Examples of the thermoplastic resin may include styrenic resins, (meth)acrylic resins, vinyl acetate resins, vinyl ether resins, halogen-containing resins, alicyclic olefinic resins, polycarbonate resins, polyester resins, polyimide resins, cellulose derivatives, silicone resins, and rubbers or elastomers.

Preferably, the thermoplastic resin is noncrystalline and is soluble in an organic solvent (particularly a common solvent in which a plurality of polymers or curable compounds can be dissolved). From the viewpoint of transparency and weather resistance, particularly preferred are styrenic resins, (meth)acrylic resins, alicyclic olefinic resins, polyester resins, cellulose derivatives (such as cellulose esters), and the like.

Examples of the thermosetting resin may include, but are not particularly limited to, phenol resins, urea resins, diallyl phthalate resins, melamine resins, guanamine resins, unsaturated polyester resins, polyurethane resins, epoxy resins, aminoalkyd resins, melamine-urea cocondensed resins, silicone resins, polysiloxane resins, and the like.

(Fine Particles)

Although the fine particles may be inorganic fine particles or organic fine particles, among them, the inorganic oxide fine particles such as silica ($SiO_2$) fine particles, alumina fine particles, titania fine particles, tin oxide fine particles, antimony-doped tin oxide (abbreviated name: ATO) fine particles, and zinc oxide fine particles are preferred. The inorganic oxide fine particles can form aggregates in the antiglare layer and a specific concavo-convex surface can be formed depending on the degree of the aggregation of the aggregates.

Examples of the organic fine particles may include plastic beads. Specific examples of the plastic beads include polystyrene beads, melamine resin beads, acrylic beads, acryl-styrene beads, silicone beads, benzoguanamine beads, benzoguanamine-formaldehyde condensate beads, polycarbonate beads, polyethylene beads, and the like.

In the above-mentioned shrinkage on curing, the organic fine particles preferably have the moderately adjusted resistance to the shrinkage on curing, of the fine particles. In order to adjust the resistance to the shrinkage, it is preferable to previously make a plurality of antiglare films containing organic fine particles made to have the varying degrees of three-dimensional crosslinking and having different hardnesses and to evaluate the transmission image sharpnesses of the antiglare films, to thereby select the degree of crosslinking suitable for a specific concavo-convex surface.

In order to use inorganic oxide particles as fine particles, the inorganic oxide particles are preferably subjected to surface treatment. By subjecting the inorganic oxide fine particles to the surface treatment, distribution of the fine particles in a functional layer 12 can be preferably controlled and the chemical resistance and saponification resistance of the fine particles in themselves can also be improved.

As the surface treatment, hydrophobization treatment in which the surfaces of fine particles are imparted with hydrophobicity is preferable. Such hydrophobization treatment can be performed by chemically reacting the surfaces of fine particles with a surface treatment agent such as a silane or a silazane. Specific examples of the surface treatment agent include dimethyldichlorosilane, silicone oil, hexamethyldisilazane, octylsilane, hexadecylsilane, aminosilane, methacrylsilane, octamethylcyclotetrasiloxane, polydimethylsiloxane, and the like. When the fine particles are inorganic oxide fine particles, hydroxyl groups are present on the surface of the inorganic oxide fine particles. Such hydrophobization treatment as described above results in reduction in the number of hydroxyl groups present on the surfaces of the inorganic oxide fine particles and in the specific surface area of the inorganic oxide fine particles, measured by the BET method, as well as can result in suppression of excessive aggregation of the inorganic oxide fine particles and in formation of a functional layer having a specific concavo-convex surface.

When inorganic oxide particles are used as the fine particle, the inorganic oxide fine particles are preferably amorphous. This is because, when the inorganic oxide particles are crystalline, a Lewis acid salt of the inorganic oxide fine particles becomes stronger due to lattice defects contained in the crystal structure thereof and the excessive aggregation of the inorganic oxide fine particles might not be controlled.

The content of fine particles with respect to the antiglare layer is not particularly limited but is preferably 0.1% by mass or more and 5.0% by mass or less. Because the content of the fine particles is 0.1% by mass or more, a specific concavo-convex surface can be more surely formed. Further, because the content of the fine particles is 5.0% by mass or less, aggregates are not excessively generated, internal diffusion and/or generation of large concavities and convexities on the surface of the functional layer can be suppressed, and cloudiness can be therefore suppressed. The lower limit of the content of the fine particles is more preferably 0.5% by mass or more while the upper limit of the content of the fine particles is more preferably 3.0% by mass or less.

The fine particles preferably have spherical shapes in a single-particle state. Such a spherical single particle of the fine particles allows an image excellent in contrast when an optical film is placed on the image display surface of an image display apparatus. As used herein, "spherical shape" means those encompassing, e.g., true-spherical shapes, ellipsoidally spherical shapes, and the like, but not encompassing any so-called indefinite shapes.

When organic fine particles are used as the fine particles, the decrease of a refractive index difference between the organic fine particles and a binder resin to, e.g., less than 0.01, by changing the copolymerization ratio of the resin having a different refractive index is preferred in view of being able to suppress the diffusion of light due to the fine particles. The average primary particle diameter of the organic fine particles is preferably less than 8.0 μm, more preferably 5.0 μm or less.

The antiglare layer 12 illustrated in FIG. 2 is formed using the fine particles 15 which form a loose aggregate in the method (A) described above. "Loose aggregate" does not mean a lump aggregate of fine particles but means an aggregate having a structure including a bent portion 15A formed by linking primary particles and an interior region 15B sandwiched by the bent portion 15A. As used herein, "bent portion" is a concept encompassing a curved portion. Examples of shapes having the bent portion 15A include V shapes, U shapes, arc shapes, C shapes, coiled shapes, basket shapes, and the like. Both ends of the bent portion 15A may be closed, and for example, the fine particles 15 may have a ring structure having the bent portion 15A.

The bent portion 15A may be formed by linking the primary particles and composed of one bent aggregate of fine particles, may be composed of a trunk portion formed by linking primary particles and a branch portion which branches from the trunk portion and is formed by linking primary particles, or may be composed of two branch portions which branch from a trunk portion and are coupled in the trunk portion. The "trunk portion" described above is a portion which is the longest in an aggregate of fine particles.

The interior region 15B is filled with the binder resin 14. It is preferable that the bent portion 15A exists to sandwich the interior region 15B from the direction of the thickness of the antiglare layer 12.

Because an aggregate which aggregates in a lump form acts as a single solid during cure shrinkage (polymerization shrinkage) of a photopolymerizable compound which becomes a binder resin after cured, the concavo-convex surface of an antiglare layer corresponds to the geometry of the aggregate. In contrast, the aggregate in which the fine particles 15 loosely aggregate includes the bent portion 15A and the interior region 15B sandwiched by the bent portion 15A, and therefore acts as a solid having a buffer action during cure shrinkage. Thus, the aggregate in which the fine particles 15 loosely aggregate is easily and homogeneously deformed during the cure shrinkage. As a result, the geometry of the concavo-convex surface 12A is looser than that in a case in which fine particles aggregate in a lump form, and the partial generation of large concavities and convexities is inhibited.

As the fine particles forming the loose aggregate, for example, inorganic oxide fine particles having an average primary particle diameter of 1 nm or more and 100 nm or less are preferred. Because the average primary particle diameter of the fine particles is 1 nm or more, an antiglare layer having a specific concavo-convex surface can be more easily formed. In addition, because the average primary particle diameter is 100 nm or less, diffusion of light due to the fine particles can be suppressed, and excellent dark room contrast can be obtained. The lower limit of the average primary particle diameter of the fine particles is more preferably 5 nm or more, and the upper limit of the average primary particle diameter of the fine particles is more preferably 50 nm or less. The average primary particle diameter of the fine particles is a value measured using image processing software from an image by a cross-sectional electron microscope (preferably a transmission electron microscope, such as TEM or STEM, with a magnification of 50000 times or more).

When inorganic oxide fine particles are used as the fine particles forming loose aggregates, the average particle diameter of the aggregates of the inorganic oxide fine particles is preferably 100 nm or more and 2.0 μm or less. A specific concavo-convex surface can be easily formed in the case of 100 nm or more while, in the case of 2.0 μm or less, diffusion of light due to the aggregates of the fine particles can be suppressed, and an image display apparatus with an optical film excellent in dark room contrast can be obtained. The lower and upper limits of the average particle diameter of the aggregates of the fine particles are preferably 200 nm or more and 1.5 μm or less, respectively.

The average particle diameter of the aggregates of inorganic oxide fine particles is obtained by selecting a region of 5 μm in each direction, containing many aggregates of the inorganic oxide fine particles, by observation with a cross-sectional electron microscope (around 10000-20000-fold magnification), measuring the particle diameters of the aggregates of the inorganic oxide fine particles in the region, and averaging the particle diameters of the aggregates of the 10 top-ranked inorganic oxide fine particles. The above-described "particle diameter of aggregate of inorganic oxide fine particles", when the cross section of an aggregate of the inorganic oxide fine particles is sandwiched between two arbitrary parallel straight lines, is measured as a distance between the straight lines in such a combination of the two lines that the distance between the two straight lines is maximum. The particle diameter of an aggregate of the inorganic oxide fine particles may also be calculated using image analysis software.

When inorganic oxide fine particles are used as the fine particles forming a loose aggregate, concavities and convexities on a concavo-convex surface of an antiglare layer are preferably formed due to only the inorganic oxide fine particles. The phrase "concavities and convexities on concavo-convex surface of antiglare layer are formed due to only inorganic oxide fine particles" means that a case in which the concavities and convexities on the concavo-convex surface of the antiglare layer are formed due to the inorganic oxide fine particles and fine particles other than the inorganic oxide fine particles is substantially excluded. As used herein, the phrase "substantially excluded" means that the antiglare layer may contain the fine particles, which are fine particles that do not form the concavities and convexities on the concavo-convex surface of the antiglare layer or which are fine particles in a slight amount in which antiglare properties are not influenced even if the fine particles form the concavities and convexities, other than the inorganic oxide fine particles.

Among inorganic oxide fine particles, a fumed silica is particularly preferred from the viewpoint of enabling a loose aggregate to be formed and a specific concavo-convex surface to be easily formed. The fumed silica is an amorphous silica that is produced by a dry method and has a particle diameter of 200 nm or less and can be obtained by reacting a volatile compound containing silicon in a vapor phase. Specific examples thereof include a product obtained by hydrolyzing a silicon compound such as silicon tetrachloride ($SiCl_4$) in oxygen and hydrogen flames; and the like. Examples of commercially available products of fumed silica include AEROSIL R805, manufactured by NIPPON AEROSIL CO., LTD.; and the like.

Fumed silicas include fumed silicas exhibiting hydrophilicity and fumed silicas exhibiting hydrophobicity. Of these, the fumed silicas exhibiting hydrophobicity are preferred from the viewpoint of the reduced amount of absorbed water and facilitated dispersion in a composition for a functional layer. A hydrophobic fumed silica can be obtained by allowing silanol groups present on the surface of the fumed silica to chemically react with such a surface treatment agent as described above. The fumed silica is most preferably subjected to octylsilane treatment from the viewpoint of easily obtaining such an aggregate as described above.

It is preferable that the BET specific surface area of the fumed silica is 100 $m^2/g$ or more and 200 $m^2/g$ or less. The formation of an adequate aggregate is facilitated without excessive dispersion of the fumed silica by setting the BET specific surface area of the fumed silica at 100 $m^2/g$ or more. The fumed silica is inhibited from forming an excessively large aggregate by setting the BET specific surface area of the fumed silica at 200 $m^2/g$ or less. The lower limit of the BET specific surface area of the fumed silica is more preferably 120 $m^2/g$, still more preferably 140 $m^2/g$. The upper limit of the BET specific surface area of the fumed silica is more preferably 180 $m^2/g$, still more preferably 165 $m^2/g$.

Such an antiglare layer 12 can be formed, for example, by the following method. First, a composition for an antiglare layer described below is applied onto the surface of the light transmissive substrate 11. Examples of methods for applying a composition for an antiglare layer include known application methods such as spin coating, dip methods, spray methods, slide coating methods, bar coating methods, roll coating methods, gravure coating methods, and die coating methods.

A composition for an antiglare layer contains at least the above-described photopolymerizable compound and the above-described fine particles. In addition, the above-described thermoplastic resin, the above-described thermosetting resin, a solvent, or a polymerization initiator may be optionally added to the composition for an antiglare layer. Further, a dispersing agent, a surfactant, an antistatic agent, a silane coupling agent, a thickener, a coloring inhibitor, a coloring agent (a pigment, a dye), an antifoaming agent, a leveling agent, a flame retardant, an ultraviolet absorbing agent, an adhesion-imparting agent, a polymerization inhibitor, an oxidation inhibitor, a surface modifier, a lubricant, or the like, known in the art, may also be added to the composition for an antiglare layer depending on a purpose such as increase in the hardness of an antiglare layer, suppression of shrinkage on curing, or control of a refractive index.

(Solvent)

The solvent can be used for the purpose of adjusting viscosity to facilitate application of the above-described composition for an antiglare layer, and for the purpose of adjusting an evaporation rate and dispersibility of fine particles, whereby the aggregation degree of fine particles in formation of an antiglare layer is adjusted to facilitate formation of a specific concavo-convex surface. Examples of the solvent may include alcohols (e.g., methanol, ethanol, propanol, isopropanol, n-butanol, s-butanol, t-butanol, benzyl alcohol, PGME, ethylene glycol), ketones (such as acetone, methyl ethyl ketone (MEK), cyclohexanone, methyl isobutyl ketone, diacetone alcohol, cycloheptanone, and diethyl ketone), ethers (such as 1,4-dioxane, dioxolane, and tetrahydrofuran), aliphatic hydrocarbons (such as hexane), alicyclic hydrocarbons (such as cyclohexane), aromatic hydrocarbons (such as toluene and xylene), halocarbons (such as dichloromethane and dichloroethane), esters (such as methyl formate, methyl acetate, ethyl acetate, propyl acetate, butyl acetate, and ethyl lactate), cellosolves (such as methyl cellosolve, ethyl cellosolve, and butyl cellosolve), cellosolve acetates, sulfoxides (such as dimethyl sulfoxide), amides (such as dimethylformamide and dimethylacetamide), and the like, and mixtures thereof.

When the mixture region 11A is formed in the vicinity of the interface between the light transmissive substrate 11 and the antiglare layer 12 as illustrated in FIG. 1, the solvent used contains a permeable solvent that has high permeability into the light transmissive substrate 11 and dissolves or swells the light transmissive substrate 11, and the photopolymerizable compound used contains at least a photopolymerizable monomer having a weight average molecular weight of 1000 or less. By using the permeable solvent and the photopolymerizable monomer, not only the permeable solvent but also the photopolymerizable monomer permeates the light transmissive substrate 11 and therefore the mixture region 11A in which the light transmissive substrate 11 is mixed with a resin containing the photopolymerizable monomer as a monomer unit can be formed in the vicinity of the interface between the light transmissive substrate 11 and the antiglare layer 12.

Examples of permeable solvents include ketones (acetone, methyl ethyl ketone (MEK), cyclohexanone, methyl isobutyl ketone, diacetone alcohol, cycloheptanone, diethyl ketone), esters (such as methyl formate, methyl acetate, ethyl acetate, propyl acetate, butyl acetate, and ethyl lactate), ethers (such as 1,4-dioxane, dioxolane, and tetrahydrofuran), cellosolves (such as methyl cellosolve, ethyl cellosolve, and butyl cellosolve), cellosolve acetates, sulfoxides (such as dimethyl sulfoxide), phenols (phenol, ortho-chlorophenol), and the like. The solvents may also be mixtures thereof. Among them, as the permeable solvent, at least one selected from the group consisting of, e.g., methyl isobutyl ketone, methyl ethyl ketone, cyclohexanone, methyl acetate, ethyl acetate, propyl acetate, and butyl acetate is preferred when a triacetylcellulose substrate is used as the light transmissive substrate while ortho-chlorophenol is preferred when a polyester substrate is used as the light transmissive substrate.

(Polymerization Initiator)

A polymerization initiator is a constituent that is decomposed by light irradiation, generates a radical, and causes the initiation or progress of the polymerization (crosslinking) of a photopolymerizable compound.

The polymerization initiator is not particularly limited as long as the polymerization initiator can release a substance that initiates radical polymerization by light irradiation. Known polymerization initiators can be used without particular limitation. Specific examples of the polymerization initiators include acetophenones, benzophenones, Michler's benzoyl benzoate, α-amyloxime ester, thioxanthones, propiophenones, benzyls, benzoins, and acylphosphine oxides. Further, it is preferable to mix and use a photosensitizer, and specific examples thereof include n-butylamine, triethylamine, poly-n-butylphosphine, and the like.

As the above-described polymerization initiator, acetophenones, benzophenones, thioxanthones, benzoins, benzoin methyl ether, and the like are preferably used singly or in mixture, when the above-described binder resin is a resin system having a radical polymerizable unsaturated group.

The content of the polymerization initiator in the composition for an antiglare layer is preferably 0.5 part by mass or more and 10.0 parts by mass or less based on 100 parts by mass of the photopolymerizable compound. The content of the polymerization initiator in this range can result in sufficiently kept hard coat performance and the suppression of curing inhibition.

The content (solid content) of a raw material in the composition for an antiglare layer is not particularly limited but is typically preferably 5% by mass or more and 70% by mass or less, more preferably 25% by mass or more and 60% by mass or less.

(Leveling Agent)

As a leveling agent, for example, silicone oil, a fluorine-based surfactant, or the like is preferred because an antiglare layer is prevented from having a Benard cell structure. When a resin composition containing a solvent is applied and dried, e.g., a difference between surface tensions on the outer and inner surfaces of a coating film is generated in the coating film, thereby resulting in a large number of convective flows in the coating film. A structure formed by the convective flows called a Benard cell structure, which causes problems such as orange peel and coating defects in an antiglare layer to be formed.

In the Benard cell structure, concavities and convexities on the surface of an antiglare layer might be excessively enlarged. Use of such a leveling agent as mentioned above can prevent the convective flows, and therefore not only provides an antiglare layer without any defect or unevenness but also facilitates the adjustment of a concavo-convex geometry on the surface of the antiglare layer.

A method for preparing a composition for an antiglare layer is not particularly limited as long as each constituent can be homogeneously mixed, and the method can be carried out using a known apparatus such as a paint shaker, a bead mill, a kneader, or a mixer.

A composition for an antiglare layer is applied to the surface of the light transmissive substrate 11, followed by being transported to a heated zone to dry the coating film-like composition for an antiglare layer, and drying the composition for an antiglare layer by any of various known methods to evaporate a solvent. The state of distribution of fine particles can be adjusted by selecting a solvent relative evaporation rate, solid content concentration, coating liquid temperature, drying temperature, a drying wind velocity, drying time, solvent atmosphere concentration in a drying zone, and the like.

Particularly, the methods of adjusting the state of the distribution of fine particles by selecting drying conditions are simple and preferable. A specific drying temperature of 30 to 120° C. and a drying wind velocity of 0.2 to 50 m/s are preferred. The state of the distribution of the fine particles can be adjusted to a desired state by performing dry treatment, appropriately adjusted in this range, once or several times.

By drying the composition for an antiglare layer, the photopolymerizable compound remains in the light transmissive substrate although the permeable solvent that permeates the light transmissive substrate is evaporated.

Then, by irradiating the coating film-like composition for an antiglare layer with light such as ultraviolet light to polymerize (crosslink) the photopolymerizable compound, the composition for an antiglare layer is cured to form the antiglare layer 12 and to form the mixture region 11A.

When ultraviolet light is used as light for curing a composition for an antiglare layer, there can be used ultraviolet light emitted from ultra-high-pressure mercury lamps, high-pressure mercury lamps, low-pressure mercury lamps, carbon-arc, xenon-arc and metal halide lamps, and the like. Further, a wavelength region of 190 to 380 nm may be used for the wavelength of the ultraviolet light. Specific examples of electron beam sources include various electron beam accelerators such as Cockcroft-Walton, Van de Graaff, resonance transformer, insulated core transformer, linear, Dynamitron, and high-frequency accelerators.

Use of a photopolymerizable compound and a solvent drying type resin as materials for forming a binder resin also enables an antiglare layer having a specific concavo-convex surface to be formed. Specifically, for example, a composition for an antiglare layer containing the photopolymerizable compound, the solvent drying type resin, and fine particles is used to form a coating film of the composition for an antiglare layer on a light transmissive substrate by a method similar to the method described above and to cure the composition for an antiglare layer in a manner similar to the manner described above. In a case in which the photopolymerizable compound and the solvent drying type resin are used in combination as the materials for forming a binder resin, a concavo-convex surface of an antiglare layer can be formed without following the geometry of fine particles, and the specific concavo-convex surface can be formed, during drying and curing, because viscosity can be increased, and cure shrinkage (polymerization shrinkage) can be reduced, compared to a case in which only a photopolymerizable compound is used. However, it will be appreciated that it is necessary to appropriately adjust the film thickness of the antiglare layer, and the like even when the antiglare layer is formed in such a method because the concavo-convex geometry of the concavo-convex surface of the antiglare layer is influenced by the film thickness of the antiglare layer, and the like.

In the present embodiment, the antiglare layer 12 has a one-layer structure. However, the antiglare layer may have a multilayer structure with two or more layers if the expression (1) and expression (2) described above are satisfied. Specifically, the antiglare layer may have a two-layer structure including an undercoat concavo-convex layer of which a surface is a concavo-convex surface and a surface adjustment layer formed on the undercoat concavo-convex layer. The undercoat concavo-convex layer may be the antiglare layer 12. The surface adjustment layer is a layer for padding fine concavities and convexities present on the surface of the undercoat concavo-convex layer, to obtain a smooth concavo-convex surface, and/or for adjusting the spacings, sizes, and the like of the concavities and convexities present on the surface of the concavo-convex layer. The surface adjustment layer has a surface which is a concavo-convex surface, and the concavo-convex surface of the surface adjustment layer is a specific concavo-convex surface. However, in a case in which the antiglare layer has a multilayer structure, there is a fear that a production step is complicated, and it is difficult to control the production step in comparison with the case of a one-layer structure. Therefore, it is preferable that the antiglare layer has a one-layer structure.

From the viewpoint of adjusting concavities and convexities, it is preferable that the film thickness of the surface adjustment layer is 0.5 μm or more and 20 μm or less. The upper limit of the film thickness of the surface adjustment layer is preferably 12 μm or less, more preferably 8 μm or less. The lower limit of the film thickness of the surface adjustment layer is preferably 3 μm or more.

The antiglare layer including the undercoat concavo-convex layer and the surface adjustment layer can be formed by a method described below using a composition for an undercoat concavo-convex layer and a composition for a surface adjustment layer as compositions for an antiglare layer.

As the composition for an undercoat concavo-convex layer, a composition similar to the composition for an antiglare layer described in the section for the above-described composition for an antiglare layer can be used. As the composition for a surface adjustment layer, a composition including at least a photopolymerizable compound similar to the photopolymerizable compound described in the section for the above-described binder resin can be used. The composition for a surface adjustment layer may include a leveling agent, a solvent, and the like similar to the leveling agent and the solvent described in the sections for the above-described composition for an antiglare layer, as well as the photopolymerizable compound.

For forming the antiglare layer including the undercoat concavo-convex layer and the surface adjustment layer, first, the composition for an undercoat concavo-convex layer is applied onto a transmissive substrate, to form a coating film with the composition for an undercoat concavo-convex layer on the light transmissive substrate. The coating film is dried, followed by irradiating the coating film with light such as ultraviolet rays, to polymerize (crosslink) a photopolymerizable compound, whereby the composition for an undercoat concavo-convex layer is cured to form the undercoat concavo-convex layer. Then, the composition for a surface adjustment layer is applied onto the undercoat concavo-convex layer, to form a coating film with the composition for a surface adjustment layer. The coating film is dried, followed by irradiating the coating film with light such as ultraviolet rays, to polymerize (crosslink) a photopolymerizable compound, whereby the composition for a surface adjustment layer is cured to form the surface adjustment layer. As a result, the antiglare layer having a specific concavo-convex surface can be formed even if fine particles forming a loose aggregate are not used. However, it will be appreciated that it is necessary to appropriately adjust, e.g., the conditions of drying the coating film, and the film thicknesses of the undercoat concavo-convex layer and the surface adjustment layer even when the antiglare layer is formed in such a method because the concavo-convex geometry of the concavo-convex surface of the antiglare layer is also influenced by, e.g., the conditions of drying the coating film, and the film thicknesses of the undercoat concavo-convex layer and the surface adjustment layer.

<<Physical Properties of Antiglare Film>>

The antiglare film 10 preferably has a total light transmittance of 85% or more. A total light transmittance of 85% or more can result in more improvement in color reproductivity and visibility when the antiglare film 10 is put on the surface of the image display apparatus. A total light transmittance of 90% or more is preferred. The total light transmittance can be measured by a method according to JIS K7361 using a haze meter (Instrument identification: HM-150, manufactured by MURAKAMI COLOR RESEARCH LABORATORY).

In the surface 10A of the antiglare film 10, the average spacing Sm of the concavities and convexities that constitute the surface 10A is preferably 0.1 mm or more and 0.8 mm or less, more preferably 0.3 mm or more and 0.6 mm or less. In the surface of the antiglare film, the average slope angle θa of the concavities and convexities that constitute the surface is preferably 0.01° or more and 0.1° or less, more preferably 0.03° or more and 0.08° or less.

In the surface 10A of the antiglare film 10, the arithmetic mean roughness Ra of the concavities and convexities that constitute the surface is preferably 0.02 μm or more and 0.12 μm or less, more preferably 0.04 μm or more and 0.10 μm or less. In the surface of the antiglare film, the maximum height roughness Ry of the concavities and convexities that constitute the surface is preferably 0.1 μm or more and 0.8 μm or less, more preferably 0.3 μm or more and 0.6 μm or less. In the surface of the antiglare film, the ten-point average roughness Rz of the concavities and convexities that constitute the surface is preferably 0.1 μm or more and 0.7 μm or less, more preferably 0.2 μm or more and 0.5 μm or less.

The definitions of "Sm", "Ra", "Ry", and "Rz" described above should comply with JIS B0601-1994. The definition of "θa" should comply with the instruction manual (revised on Jul. 20, 1995) of a surface roughness measuring instrument: SE-3400, manufactured by Kosaka Laboratory Ltd. Specifically, θa is represented by the following expression (6):

$$\theta a = \tan^{-1} \Delta a \qquad (6).$$

In the expression, Δa is a slope represented in an aspect ratio and a value obtained by dividing the total sum of differences between the minimum portions and the maximum portions of respective concavities and convexities (equivalent to the heights of the respective convexities) by a reference length.

Sm, θa, Ra, Ry, and Rz can be measured, for example, using a surface roughness measuring instrument (model number: SE-3400, manufactured by Kosaka Laboratory Ltd.) under the following measurement conditions:

1) Tracer in Surface Roughness Detector (trade name: SE2555N (standard 2 μm), manufactured by Kosaka Laboratory Ltd.)
  Radius of curvature in tip: 2 μm, apex angle: 90 degrees, material: diamond
2) Measurement Conditions for Surface Roughness Measuring Instrument
  Reference length (cutoff value λc of roughness curve): 2.5 mm
  Evaluation length (reference length (cutoff value λc)×5): 12.5 mm
  Feed speed of tracer: 0.5 mm/s
  Preliminary length: (cutoff value λc)×2
  Longitudinal magnification: 2000 times
  Lateral magnification: 10 times According to the present embodiment, glare can be suppressed for the reasons described above even if the antiglare film 10 has a low total haze of 0% or more and 5% or less and a low internal haze of 0% or more and 5% or less, because the antiglare film 10 satisfies the expression (1) and expression (2) described above assuming that the transmission image sharpness of the antiglare film 10, measured using an optical comb with a width of 0.125 mm, is C (0.125), and that the transmission image sharpness of the antiglare film 10, measured using an optical comb with a width of 0.25 mm, is C (0.25).

When the antiglare layer 12 is formed using inorganic oxide fine particles having an average primary particle diameter of 1 nm or more and 100 nm or less (for example, fumed silica) as the fine particles, the antiglare film 10 having a lower total haze value (for example, a total haze value of 1% or less) and a lower internal haze value (for example, an internal haze value of substantially 0%) can be obtained. In other words, the total haze and internal haze of the antiglare film is the percentage of transmitted light deviating at 2.5 degrees or more from incident light due to forward scattering, to transmitted light transmitted through the antiglare film, and therefore, the total haze value and the internal haze are lowered if the percentage of transmitted light deviating at 2.5 degrees or more from incident light can be reduced. In contrast, the inorganic oxide fine particles having an average primary particle diameter of 100 nm or less form a loose aggregate without aggregating in a lump form in the antiglare layer 12, and therefore, light transmitted through the antiglare layer 12 is inhibited from diffusing in the antiglare layer 12. Thus, when the antiglare layer 12 is formed using the inorganic oxide fine particles having an average primary particle diameter of 1 nm or more and 100 nm or less, the generation of transmitted light deviating at 2.5 degrees or more from incident light can be suppressed, whereby the antiglare film 10 having a lower total haze value and a lower internal haze value can be obtained.

When the concavities and convexities on the concavo-convex surface 12A of the antiglare layer 12 are formed due to only the inorganic oxide fine particles, the concavo-convex surface 12A having loose and homogeneous concavities and convexities enabling antiglare properties to be obtained is easily formed. Therefore, the antiglare film 10 which has a low total haze value and a low internal haze value and enables glare to be further suppressed can be obtained.

According to the present embodiment, the antiglare film 10 has a total haze value of 0% or more and 5% or less and an internal haze value of 0% or more and 5% or less, and therefore, deterioration in luminance and light transmissiveness can be suppressed. Because diffusion of image light in the antiglare film 10 can be suppressed, part of image light does not become stray light. As a result, there is no fear that a dark room contrast is reduced, and there is no fear that an image blurs. As a result, the antiglare film 10 incorporated into a super-high-definition image display apparatus having 3000 or more horizontal pixels, such as 4K2K (3840 (the number of horizontal pixels)×2160 (the number of vertical pixels)), can be used.

According to the present embodiment, the antiglare film 10 includes the antiglare layer 12 having the concavo-convex surface 12A, and therefore, interference between light reflected on an interface between the light transmissive substrate 11 and the antiglare layer 12 and light reflected on the concavo-convex surface 12A of the antiglare layer 12 can be suppressed. As a result, generation of interference fringes can be suppressed. When the mixture region 11A is formed, reflection on the interface between the light transmissive substrate 11 and the antiglare layer can be suppressed, and therefore, the generation of interference fringes can be more suppressed.

When the concavities and convexities on the concavo-convex surface 12A of the antiglare layer 12 are formed due to only the inorganic oxide fine particles, it also becomes easy to prevent the slope angles of the concavities and convexities forming the concavo-convex surface 12A from increasing. As a result, excessive diffusion of extraneous light does not occur, and therefore, reduction in bright room contrast can be suppressed. Because image light can also be prevented from becoming stray light, a favorable dark room contrast can also be provided. Furthermore, in the case of displaying a dynamic image, the gloss and brightness of the image are increased to be able to provide dynamism, due to an adequate regular reflection component. As a result, black color feeling including both of an excellent contrast and excellent dynamism can be provided.

A method for improving glare can also be provided by the antiglare film satisfying the expressions (1) and (2) described above.

<<Polarizing Plate>>

Figure 4:
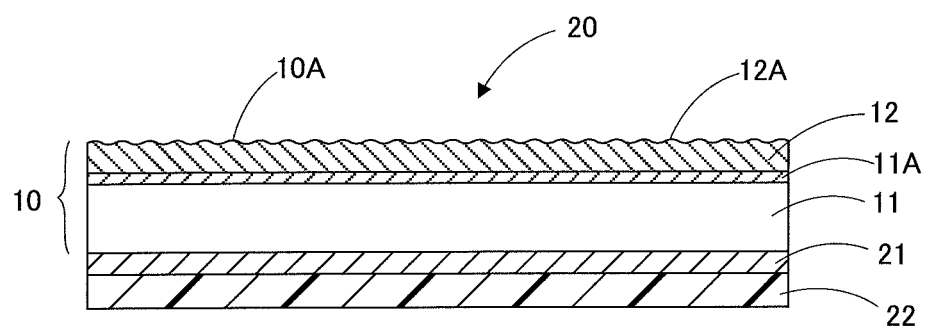
FIG. 4 is a schematic view illustrating the configuration of a polarizing plate according to the first embodiment.

The antiglare film 10 may be incorporated, for example, into a polarizing plate and be used. FIG. 4 is a schematic view illustrating the configuration of a polarizing plate into which the antiglare film according to the present embodiment is incorporated. As illustrated in FIG. 4, a polarizing plate 20 includes the antiglare film 10, a polarizing element 21, and a protective film 22. The polarizing element 21 is formed on a surface of the light transmissive substrate 11 and the surface of the polarizing element 21 is opposite to the other surface thereof on which the antiglare layer 12 is formed. The protective film 22 is placed on a surface of the polarizing element 21, which surface is opposite to the other surface on which the antiglare film 10 is placed. The protective film 22 may also be a retardation film.

Examples of the polarizing element 21 include polyvinyl alcohol films, polyvinyl formal films, polyvinyl acetal films, ethylene-vinyl acetate copolymer-based saponified films, and the like, dyed with iodine or the like and stretched. When the antiglare film 10 and the polarizing element 21 are laminated, it is preferable to previously subject the light transmissive substrate 11 to saponification treatment. Better adhesiveness and an antistatic effect can also be obtained by the saponification treatment.

<<Liquid Crystal Panel>>

Figure 5:
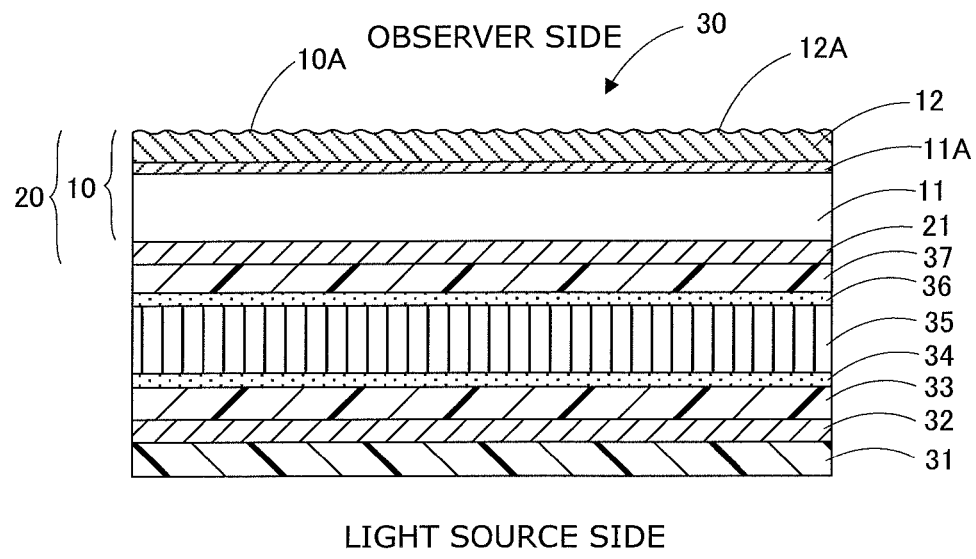
FIG. 5 is a schematic view illustrating the configuration of a liquid crystal panel according to the first embodiment.

The antiglare film 10 and the polarizing plate 20 may be incorporated into a liquid crystal panel and be used. FIG. 5 is a schematic view illustrating the configuration of a liquid crystal panel into which the antiglare film according to the present embodiment is incorporated.

The liquid crystal panel 30 illustrated in FIG. 5 has a structure in which a protective film 31 such as a triacetylcellulose film (TAC film), a polarizing element 32, a retardation film 33, an adhesive layer 34, a liquid crystal cell 35, an adhesive layer 36, a retardation film 37, the polarizing element 21, and the antiglare film 10 are layered in the order mentioned from a light source side (backlight unit side) to an observer side. In the liquid crystal cell 35, a liquid crystal layer, an oriented film, an electrode layer, a color filter, and the like are placed between two glass substrates.

Examples of the retardation films 33 and 37 include triacetylcellulose films and cycloolefin polymer films. The retardation film 37 may also be the same as the protective film 22. Examples of adhesives constituting the adhesive layers 34 and 36 include pressure-sensitive adhesives (PSAs).

In the liquid crystal panel 30 illustrated in FIG. 5, the protective film 31 can also be replaced with the antiglare film 10. In this case, the antiglare film 10 instead of the protective film 31 is placed so that the concavo-convex surface 12A of the antiglare layer 12 is directed at a light source side.

<<Image Display Apparatus>>

Figure 6:
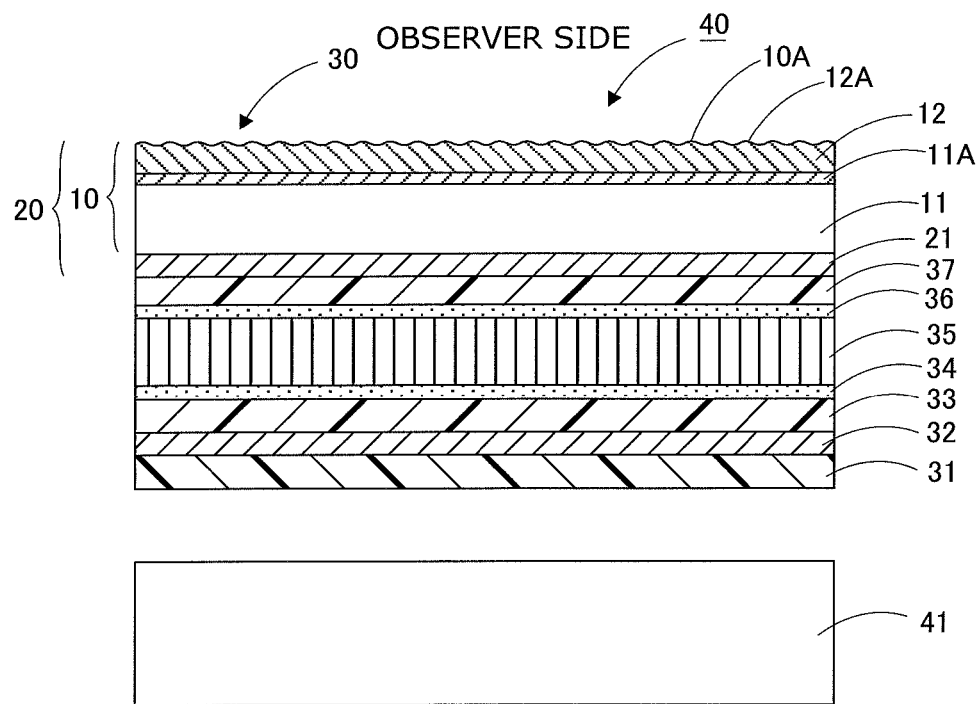
FIG. 6 is a schematic view illustrating the configuration of a liquid crystal display which is an example of an image display apparatus according to the first embodiment.

The antiglare film 10, the polarizing plate 20, and the liquid crystal panel 30 may be incorporated into a super-high-definition image display apparatus having 3000 or more horizontal pixels, such as 4K2K (3840 (the number of horizontal pixels)×2160 (the number of vertical pixels)), and be used. Examples of the image display apparatus include liquid crystal displays (LCDs), cathode ray tube displays (CRTs), plasma displays (PDPs), electroluminescence displays (ELDs), field emission displays (FEDs), touch panels, tablet PCs, electronic papers, and the like. FIG. 6 is a schematic view illustrating the configuration of a liquid crystal display which is an example of the image display apparatus into which the antiglare film according to the present embodiment is incorporated.

An image display apparatus 40 illustrated in FIG. 6 is a liquid crystal display having 3000 or more horizontal pixels. The image display apparatus 40 is configured by a backlight unit 41; and the liquid crystal panel 30 including the antiglare film 10 placed in a side closer to an observer side than the backlight unit 41. As the backlight unit 41, a known backlight unit can be used.

In the image display apparatus 40 illustrated in FIG. 6, the protective film 31 can also be replaced with the antiglare film 10. In this case, the antiglare film 10 instead of the protective film 31 is placed so that the concavo-convex surface 12A of the antiglare layer 12 is directed at a light source side.

Second Embodiment

Figure 7:
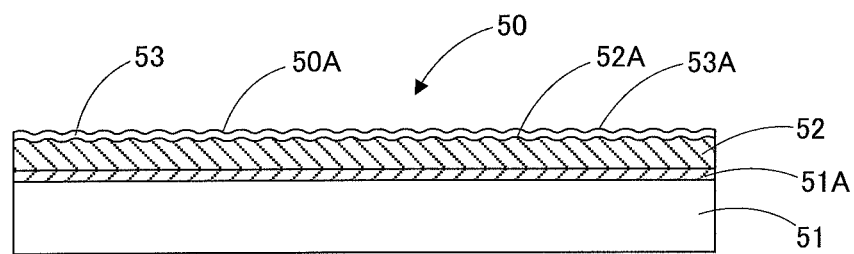
FIG. 7 is a schematic view illustrating the configuration of an antiglare film according to a second embodiment.

An antiglare film according to a second embodiment of the present invention will be described below with reference to the drawings. In the second embodiment, a content overlapping with that in the first embodiment should be omitted unless otherwise specified. FIG. 7 is a schematic view illustrating the configuration of the antiglare film according to the present embodiment.

<<Antiglare Film>>

As illustrated in FIG. 7, an antiglare film 50 includes at least a light transmissive substrate 51, an antiglare layer 52 that is disposed on the light transmissive substrate 51 and includes a concavo-convex surface 52A, and a functional layer 53 disposed on the antiglare layer 52. The description of the light transmissive substrate 51 should be omitted in the present embodiment because the light transmissive substrate 51 is similar to the light transmissive substrate 11 described in the first embodiment. In the vicinity of the interface between the light transmissive substrate 51 and the antiglare layer 52, it is preferable to form a mixture region 51A in which the light transmissive substrate 51 and the constituent of the binder resin of the antiglare layer 52 are mixed as illustrated in FIG. 7.

A surface 50A of the antiglare film 50 is a concavo-convex surface. In the present embodiment, a surface 53A of the functional layer 53 is the surface 50A of the antiglare film 50 because the functional layer 53 is disposed on the antiglare layer 52.

The antiglare film 50 has a total haze value of 0% or more and 5% or less and an internal haze value of 0% or more and 5% or less. The antiglare film 50 preferably has a total haze value of 1% or less, more preferably 0.3% or more and 0.5% or less. It is preferable that the internal haze value is substantially 0%.

When the antiglare film 50 has a total haze value of 0% or more and 5% or less and an internal haze value of 0% or more and 5% or less, the antiglare film 50 has a surface haze value of 0% or more and 5% or less. The antiglare film 50 preferably has a surface haze value of 0% or more and 1% or less, more preferably 0% or more and 0.3% or less.

In the antiglare film 50, assuming that the transmission image sharpness of the antiglare film 50, measured using an optical comb with a width of 0.125 mm, is C (0.125), and that the transmission image sharpness of the antiglare film 10, measured using an optical comb with a width of 0.25 mm, is C (0.25), expressions (1) and (2) described below are satisfied:

$$C(0.25)-C(0.125) \geq 2\% \quad (1); \text{ and}$$

$$C(0.125) \geq 65\% \quad (2).$$

In the present embodiment, the transmission image sharpness of the antiglare film 50 is a transmission image sharpness measured using the antiglare film 50 including the light transmissive substrate 51, the antiglare layer 52, and the functional layer 53 because the functional layer 53 is disposed on the antiglare layer 52.

A difference between a value of C (0.25) and a value of C (0.125) is preferably 3% or more, more preferably 4% or more. It is preferable that the value of C (0.125) is 75% or more. The value of C (0.125) is preferably 90% or less, more preferably 85% or less, still more preferably 80% or less, in view of securing antiglare properties.

In the present embodiment, the concavo-convex geometry of the surface 50A of the antiglare film 50 and the concavo-convex geometry of the concavo-convex surface 52A of the antiglare layer 52 may be different if the antiglare film 50 satisfies the above (1) and (2). When a low-refractive-index layer is used as the functional layer 53, the concavo-convex geometry of the concavo-convex surface of the antiglare layer is maintained in the nearly as-is status thereof on a surface of the low-refractive-index layer because the low-refractive-index layer has a small film thickness. Thus, the concavo-convex geometry of the surface 50A of the antiglare film 50 (surface 53A of functional layer 53) is substantially the concavo-convex geometry of the concavo-convex surface 52A of the antiglare layer 52. A case in which the low-refractive-index layer is used as the functional layer 53 will be described below.

It is preferable that the antiglare film 50 has physical properties similar to the physical properties described in the section for the physical properties of the above-described antiglare film.

<Antiglare Layer>

The description of the antiglare layer 52 should be omitted in the present embodiment because the antiglare layer 52 is similar to the antiglare layer 12 described in the first embodiment.

<Low-Refractive-Index Layer>

The low-refractive-index layer is intended to reduce the reflectance of light from the outside (e.g., fluorescent lamp, natural light, etc.), reflected on the surface of the antiglare film. The low-refractive-index layer has a refractive index that is lower than that of the antiglare layer. Specifically, for example, the low refractive index preferably has a refractive index of 1.45 or less, more preferably a refractive index of 1.42 or less.

The thickness of the low-refractive-index layer is not limited but may be typically appropriately set within the range of around 30 nm to 1 μm. The thickness $d_A$ (nm) of the low-refractive-index layer preferably satisfies the following expression (7):

$$d_A = m\lambda/(4n_A) \quad (7).$$

In the above-described expression, $n_A$ represents the refractive index of the low-refractive-index layer; m represents a positive odd number, preferably 1; and λ is a wavelength, preferably a value in the range of 480 nm or more and 580 nm or less.

From the viewpoint of a lower reflectance, the low-refractive-index layer preferably satisfies the following expression (8):

$$120 < n_A d_A < 145 \quad (8).$$

As for the low-refractive-index layer, the single layer provides an effect while two or more low-refractive-index layers can be appropriately placed for the purpose of adjusting a lower minimum reflectance or a higher minimum reflectance. When the two or more low-refractive-index layers are placed, the refractive indices and thicknesses of the respective low-refractive-index layers are preferably different.

The low-refractive-index layer can be preferably constituted by any of 1) a resin containing low-refractive-index particles of silica, magnesium fluoride, or the like; 2) a fluorinated resin which is a low-refractive-index resin; 3) a fluorinated resin containing silica or magnesium fluoride; 4) a thin film with a low-refractive-index substance such as silica or magnesium fluoride; and the like. As a resin except the fluorinated resins, a resin similar to the binder resin constituting the above-mentioned antiglare layer can be used.

Further, silica is preferably a hollow silica fine particle, and such hollow silica fine particles can be produced, for example, by a production method described in Examples in Japanese Patent Laid-Open No. 2005-099778.

For the fluorinated resins, a polymerizable compound containing at least a fluorine atom in a molecule or a polymer thereof may be used. The polymerizable compound is not particularly limited but preferably has a curing reactive group such as a photopolymerizable functional group or a polar group which is thermally cured. Also, the polymerizable compound may be a compound simultaneously having these reactive groups together. In contrast to the polymerizable compound, the polymer does not have any reactive group as described above.

As such photopolymerizable compounds, a wide variety of fluorine-containing monomers having ethylenically unsaturated bonds may be used. More specifically, examples thereof may include fluoroolefins (such as fluoroethylene, vinylidene fluoride, tetrafluoroethylene, hexafluoropropylene, perfluorobutadiene, and perfluoro-2,2-dimethyl-1,3-dioxole). As (meth)acryloyloxy group-containing compounds, there may also be mentioned (meth)acrylate compounds with fluorine atoms in a molecule, such as 2,2,2-trifluoroethyl(meth)acrylate, 2,2,3,3,3-pentafluoropropyl(meth)acrylate, 2-(perfluorobutyl)ethyl(meth)acrylate, 2-(perfluorohexyl)ethyl(meth)acrylate, 2-(perfluorooctyl)ethyl(meth)acrylate, 2-(perfluorodecyl)ethyl(meth)acrylate, methyl α-trifluoromethacrylate, and ethyl α-trifluoromethacrylate; fluorine-containing polyfunctional (meth)acrylic acid ester compounds having in a molecule a $C_1$-$C_{14}$ fluoroalkyl, fluorocycloalkyl or fluoroalkylene group with at least three fluorine atoms, and at least two (meth)acryloyloxy groups; and the like.

As examples of the above-described polar group which is thermally cured, there are preferred hydrogen bond-forming groups such as hydroxyl, carboxyl, amino and epoxy groups. These are excellent not only in adhesiveness with coating films but also in affinity with inorganic ultrafine particles such as silica. Examples of polymerizable compounds having thermosetting polar groups include 4-fluoroethylene-perfluoroalkylvinyl ether copolymers; fluoroethylene-hydrocarbon-based vinyl ether copolymers; fluorine-modified products of various resins such as epoxy, polyurethane, cellulose, phenol and polyimide resins; and the like.

Examples of polymerizable compounds having both photopolymerizable functional groups and polar groups which are thermally cured, as described above, may include partially or fully fluorinated alkyl, alkenyl and aryl esters of acrylic or methacrylic acid; fully or partially fluorinated vinyl ethers; fully or partially fluorinated vinyl esters; fully or partially fluorinated vinyl ketones; and the like.

Examples of the fluorinated resins may include: polymers of monomers or monomer mixtures containing at least one fluorine-containing (meth)acrylate compound of the above-described polymerizable compounds with ionizing radiation curable groups; copolymers of at least one of the above-described fluorine-containing (meth)acrylate compounds with a (meth)acrylate compound containing no fluorine atom in a molecule, such as methyl(meth)acrylate, ethyl(meth)acrylate, propyl(meth)acrylate, butyl(meth)acrylate or 2-ethylhexyl(meth)acrylate; fluorine monomer-containing homopolymers or copolymers such as fluoroethylene, vinylidene fluoride, trifluoroethylene, chlorotrifluoroethylene, 3,3,3-trifluoropropylene, 1,1,2-trichloro-3,3,3-trifluoropropylene or hexafluoropropylene; and the like. Silicone-containing vinylidene fluoride copolymers obtained by containing a silicone component in these copolymers may also be used. Examples of silicone components in this case include (poly)dimethylsiloxane, (poly)diethylsiloxane, (poly)diphenylsiloxane, (poly)methylphenylsiloxane, alkyl-modified (poly)dimethylsiloxane, azo group-containing (poly)dimethylsiloxane, dimethylsilicone, phenyl methyl-silicone, alkyl/aralkyl-modified silicone, fluorosilicone, polyether-modified silicone, fatty acid ester-modified silicone, methylhydrogen silicone, silanol group-containing silicone, alkoxy group-containing silicone, phenol group-containing silicone, methacryl-modified silicone, acryl-modified silicone, amino-modified silicone, carboxylic acid-modified silicone, carbinol-modified silicone, epoxy-modified silicone, mercapto-modified silicone, fluorine-modified silicone, polyether-modified silicone, and the like. Compounds with dimethylsiloxane structures are preferred among the above.

Furthermore, non-polymers or polymers containing such compounds as described below may also be used as the fluorinated resins. That is, there may be used compounds obtained by reacting fluorine-containing compounds having at least one isocyanate group in a molecule with compounds having at least one isocyanate group-reacting functional group such as an amino, hydroxyl or carboxyl group in a molecule; compounds obtained by reacting fluorine-containing polyols such as fluorine-containing polyether polyols, fluorine-containing alkyl polyols, fluorine-containing polyester polyols, and fluorine-containing ε-caprolactone-modified polyols, with isocyanate group-containing compounds; and the like.

Also, such various binder resins as described as well as the above-described polymerizable compounds having fluorine atoms and polymers may be mixed with the above-described antiglare layer 12 and be used. Furthermore, there may be appropriately used a curing agent for curing a reactive group and/or the like as well as various additives and solvents for improving coating properties and for imparting antifouling properties.

For forming the low-refractive-index layer, the viscosity of a composition for a low-refractive-index layer obtained by adding the above-mentioned materials is preferably 0.5 to 5 mPa·s (25° C.) at which preferred application properties are obtained, preferably in the range of 0.7 to 3 mPa·s (25° C.). An antireflection layer with excellent visible light rays can be realized, a homogeneous thin film without application unevenness can be formed, and a low-refractive-index layer which is particularly excellent in adhesiveness can be formed.

Means for curing a composition for a low-refractive-index layer may be the same as described in the antiglare layer 12 according to the first embodiment. When heating means is used for curing treatment, a thermal polymerization initiator that generates, e.g., radicals and initiates polymerization of the polymerizable compound by heating is preferably added to the fluorinated resin composition.

According to the present embodiment, glare can be suppressed for reasons similar to those in the first embodiment even if the antiglare film 50 has a low total haze of 0% or more and 5% or less and a low internal haze of 0% or more and 5% or less, because the antiglare film 50 satisfies the expression (1) and expression (2) described above assuming that the transmission image sharpness of the antiglare film 50, measured using an optical comb with a width of 0.125 mm, is C (0.125), and that the transmission image sharpness of the antiglare film 10, measured using an optical comb with a width of 0.25 mm, is C (0.25).

According to the present embodiment, the extraneous light reflectance of the antiglare film 50 can be reduced when the low-refractive-index layer is formed as the functional layer 53 on the antiglare layer 52. Because the extraneous light reflectance is reduced, the light transmittance of the antiglare film 50 is relatively increased, whereby the light transmittance of the antiglare film 50 can be improved.

Third Embodiment

Figure 8:
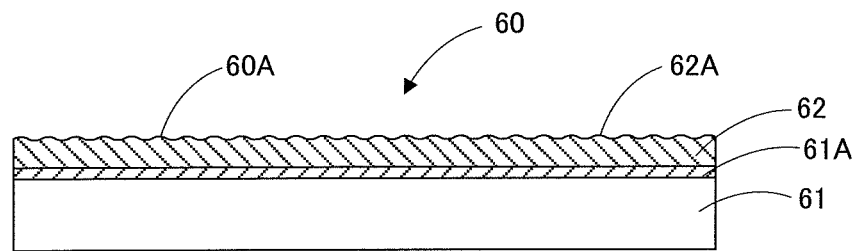
FIG. 8 is a schematic view illustrating the configuration of an antiglare film according to a third embodiment.

An antiglare film according to a third embodiment of the present invention will be described below with reference to the drawings. In the third embodiment, a content overlapping with that in the first embodiment should be omitted unless otherwise specified. FIG. 8 is a schematic view illustrating the configuration of the antiglare film according to the present embodiment.

<<Antiglare Film>>

As illustrated in FIG. 8, an antiglare film 60 includes a light transmissive substrate 61 and an antiglare layer 62 that is disposed on the light transmissive substrate 61 and includes a concavo-convex surface 62A. In the antiglare film 60, in the vicinity of the interface between the light transmissive substrate 61 and the antiglare layer 62, it is preferable to form a mixture region 61A in which the light transmissive substrate 61 and a resin containing as a monomer unit a photopolymerizable monomer having a weight average molecular weight of 1000 or less are mixed as illustrated in FIG. 8.

A surface 60A of the antiglare film 60 is a concavo-convex surface. In the present embodiment, the concavo-convex surface 62A of the antiglare layer 62 is the surface 60A of the antiglare film 60 because a functional layer such as a low-refractive-index layer is not disposed on the antiglare layer 62.

The antiglare film 60 has a total haze value of 0% or more and 5% or less and an internal haze value of 0% or more and 5% or less. The total haze values and the internal haze value are values measured for the entire antiglare film. For example, in the present embodiment, the total haze value and internal haze value of the antiglare film 60 are values measured using the antiglare film 60 including the light transmissive substrate 61 and the antiglare layer 62 because a functional layer such as a low-refractive-index layer is not disposed on the antiglare layer 62. For example, when a functional layer such as a low-refractive-index layer is disposed on an antiglare layer as described in a fourth embodiment, the total haze value and internal haze value of the antiglare film are values measured using an antiglare film including a light transmissive substrate, an antiglare layer, and the functional layer.

The total haze value and the internal haze value can be measured by a method similar to the method described in the first embodiment.

The antiglare film 60 preferably has a total haze value of 1% or less, more preferably 0.3% or more and 0.5% or less. It is preferable that the internal haze value thereof is substantially 0%. The phrase "internal haze value is substantially 0%" is not limited to a case in which the internal haze value is completely 0% but has a meaning including a range in which the internal haze value can be regarded as approximately 0%, within a measurement error even in a case in which the internal haze value is more than 0% (for example, internal haze value of 0.3% or less).

When the antiglare film 60 has a total haze value of 0% or more and 5% or less and an internal haze value of 0% or more and 5% or less, the antiglare film 60 has a surface haze value of 0% or more and 5% or less. The antiglare film 60 preferably has a surface haze value of 0% or more and 1% or less, more preferably 0% or more and 0.3% or less. The surface haze value is synonymous with the surface haze value described in the first embodiment, and can be measure by a method similar to that in the first embodiment.

Assuming that the surface 60A of the antiglare film 60 has an arithmetic mean roughness of Ra (100) [µm] at a long wavelength cutoff wavelength of 100 µm and that the surface 60A of the antiglare film 60 has an arithmetic mean roughness of Ra (100-1000) [µm] at a short wavelength cutoff wavelength of 100 µm and at a long wavelength cutoff wavelength of 1000 µm, the antiglare film 60 satisfies the following expression (3) and expression (4):

$$Ra(100)/Ra(100\text{-}1000) \leq 0.5 \quad (3); \text{ and}$$

$$0.04 \text{ µm} \leq Ra(100\text{-}1000) \leq 0.12 \text{ µm} \quad (4).$$

The "long wavelength cutoff wavelength" described above is a wavelength set to exclude concavities and convexities with longer wavelengths than the cutoff wavelength when the arithmetic mean roughness of a surface of an antiglare film is determined. Thus, concavities and convexities with longer wavelengths than 100 µm are excluded when Ra (100) is measured, while concavities and convexities with longer wavelengths than 1000 µm are excluded when Ra (100-1000) is measured. The "short wavelength cutoff wavelength" described above is a wavelength set to exclude concavities and convexities with shorter wavelengths than the cutoff wavelength when the arithmetic mean roughness of a surface of an antiglare film is determined. Thus, concavities and convexities with shorter wavelengths than 100 µm are excluded when Ra (100-1000) is measured.

The above-described "surface of antiglare film" means a surface of a functional layer when the functional layer such as a low-refractive-index layer is formed on the antiglare layer, and means a surface of the antiglare layer when the functional layer such as a low-refractive-index layer is not formed on the antiglare layer. The above-described "surface of functional layer" means a surface opposite to a surface, closer to a light transmissive substrate, of the functional layer (back surface of functional layer), and the above-described "surface of antiglare layer" means a surface opposite to a surface, closer to the light transmissive substrate, of the antiglare layer (back surface of antiglare layer). In the antiglare film 60 illustrated in FIG. 8, the surface 60A of the antiglare film 60 is a surface of the antiglare layer 62 because a low-refractive-index layer is not disposed on the antiglare layer 62.

The present inventors found that: concavities and convexities with longer wavelengths than 1000 µm represent the overall waviness of an antiglare film and have no direct relationship with optical properties; concavities and convexities with wavelengths of 100 μm to 1000 μm correspond to a region viewed as optical properties by the human eye, and antiglare properties are determined mainly by the concavities and convexities with the wavelengths in this range; and concavities and convexities with wavelengths of less than 100 μm create fine distortion in the concavities and convexities, thereby causing glare, although being unable to be directly viewed by the human eye. In other words, the stronger the concavities and convexities components with wavelengths of less than 100 μm are, the more easily the glare occurs. There is a tendency that the more the arithmetic mean roughness of the concavities and convexities is, the stronger the glare is, although the stronger the antiglare properties are. Thus, in the present invention, a value of Ra (100)/Ra (100-1000) is set at 0.5 or less, and a value of Ra (100-1000) is set at 0.04 μm or more and 0.12 μm or less, in order to suppress glare and to blur the contour of an image reflected on an image display surface. The reason why the value of Ra (100)/Ra (100-1000) is set at 0.5 or less is because glare may occur due to the high percentage of Ra (100) when this value is more than 0.5. The reason why the value of Ra (100-1000) is set at 0.04 μm or more and 0.12 μm or less is because a value of Ra (100-1000) of less than 0.04 μm makes it impossible to blur the contour of a reflected image due to weak antiglare properties, and because a value of Ra (100-1000) of more than 0.12 μm results in occurrence of glare although resulting in stronger antiglare properties. Although cutoff values for measuring arithmetic mean roughness are specified in JIS B0601-1994, the cutoff values specified in JIS B0601-1994 are 0.08 mm and the like, and are therefore quite different from the cutoff wavelengths of the present invention.

Ra (100) of the surface 60A of the antiglare film 60 preferably satisfies an expression (9) described below from the viewpoint of more suppressing glare. Ra (100) may be 0 μm.

$$Ra(100) \leq 0.03 \text{ μm} \qquad (9)$$

The lower limit of Ra (100-1000) is preferably 0.045 μm or more, more preferably 0.05 μm or more. The upper limit of Ra (100-1000) is preferably 0.1 μm or less, more preferably 0.08 μm or less.

Measurement of Ra (100) and Ra (100-1000) on a surface of an antiglare film is performed by measuring the surface geometry of the antiglare film. Examples of surface geometry measuring apparatuses include contact-type surface roughness measuring instruments and non-contact-type surface roughness measuring instruments (e.g., interference microscopes, confocal microscopes, and atomic force microscopes, and the like). Among them, an interference microscope is preferred in view of simpleness of measurement. Examples of such interference microscopes include "New View" series, manufactured by Zygo Corporation; and the like.

It is preferable that a sampling interval for measuring a surface geometry is 4 μm or less. When the sampling interval is more than 4 μm, there is a fear that it is impossible to accurately estimate fine distortion influencing glare. A larger measurement area is preferable, and it is preferable to perform the measurement in a region of at least 500 μm×500 μm or more, more preferably 2 mm×2 mm or more.

<Light Transmissive Substrate, Mixture Region>

The description of the light transmissive substrate 61 and the mixture region 61A is omitted because the light transmissive substrate 61 and the mixture region 61A are similar to the light transmissive substrate 11 and mixture region 11A described in the first embodiment.

<Antiglare Layer>

The antiglare layer 62 is a layer that exerts an antiglare property. The antiglare layer 62 exerts the antiglare property, and may exert another function. Specifically, the antiglare layer 62 may be a layer that exerts the antiglare property and exerts, for example, a function such as a hard coat property, an anti-reflecting property, an antistatic property, or an antifouling property.

When the antiglare layer 62 is a layer that exerts a hard coat property as well as an antiglare property, the antiglare layer 62 has a hardness of "H" or more on the pencil hardness test (load of 4.9 N) defined in JIS K5600-5-4 (1999).

The surface of the antiglare layer 62 is the concavo-convex surface 62A as described above. "Surface of antiglare layer" means a surface opposite to a surface, closer to the light transmissive substrate, of the antiglare layer (back surface of antiglare layer).

In the present embodiment, whether the surface 60A of the antiglare film 60 satisfies the expression (3) and expression (4) described above depends on the concavo-convex geometry of the concavo-convex surface 62A of the antiglare layer 62 because the surface 60A of the antiglare film 60 is the concavo-convex surface 62A of the antiglare layer 62. Hereinafter, the concavo-convex surface of such an antiglare layer that an antiglare film satisfies the expression (3) and expression (4) described above is referred to as "specific concavo-convex surface" in the present embodiment.

The specific concavo-convex surface of the present embodiment can be formed by appropriately adjusting the number of concavities and convexities, the sizes of concavities and convexities, the angles of the inclinations of concavities and convexities, or the like. Examples of adjustment methods thereof include (A) a method for forming a concavo-convex surface using a composition for an antiglare layer, containing a photopolymerizable compound which becomes a binder resin after cured, and fine particles, (B) a method for forming a concavo-convex surface by a transfer method using a die, (C) a method for forming a concavo-convex surface by roughening the surface of the antiglare layer by sandblast, or (D) a method for forming a concavo-convex surface by applying concavities and convexities onto the surface of an antiglare layer by an emboss roll. Of these, the above-described method (A) is preferred because production is easy.

In the above-described method (A), when the photopolymerizable compound is polymerized (crosslinked) to become the binder resin, shrinkage as a whole occurs because the photopolymerizable compound effects shrinkage on curing in a portion in which any fine particles are not present. In contrast, only the photopolymerizable compound existing above or below the fine particles effects shrinkage on curing because the fine particles do not effect shrinkage on curing in a portion in which the fine particles are present. As a result, the film thickness of the antiglare layer in the portion in which the fine particles are present is larger than that in the portion in which any fine particles are not present and, therefore, the surface of the antiglare layer has a concavo-convex geometry. Thus, the antiglare layer having the specific concavo-convex surface can be formed by appropriately selecting the kind and particle diameters of the fine particles and the kind of the photopolymerizable compound to adjust film formation conditions.

Figure 9:
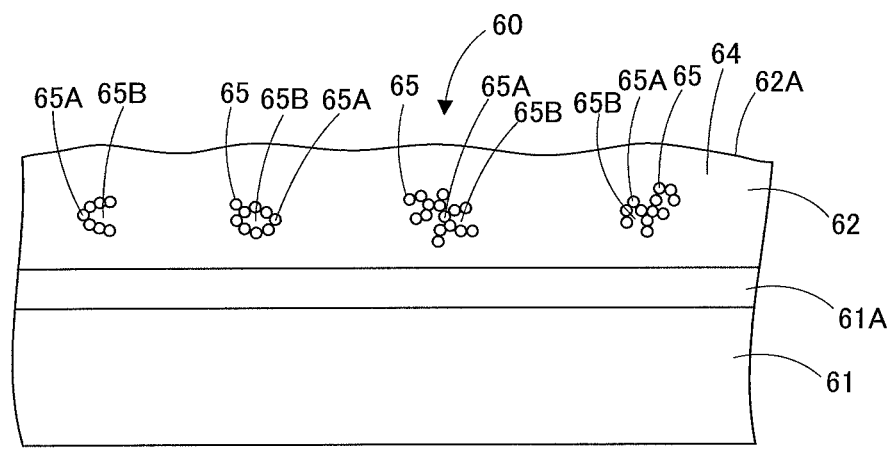
FIG. 9 is a view of an enlarged part of FIG. 8.

The antiglare layer 62 includes the binder resin 64 and fine particles 65 as illustrated in FIG. 9, and is formed by the above-described method (A).

(Binder Resin)

The description of the binder resin is omitted in the present embodiment because the binder resin is similar to the binder resin described in the first embodiment.

(Fine Particles)

Although the fine particles may be inorganic fine particles or organic fine particles, among them, the inorganic oxide fine particles such as silica ($SiO_2$) fine particles, alumina fine particles, titania fine particles, tin oxide fine particles, antimony-dope tin oxide (abbreviated name: ATO) fine particles, and zinc oxide fine particles are preferred. The inorganic oxide fine particles can form aggregates in the antiglare layer and a specific concavo-convex surface can be formed depending on the degree of the aggregation of the aggregates.

Examples of the organic fine particles may include plastic beads. Specific examples of the plastic beads include polystyrene beads, melamine resin beads, acrylic beads, acryl-styrene beads, silicone beads, benzoguanamine beads, benzoguanamine-formaldehyde condensate beads, polycarbonate beads, polyethylene beads, and the like.

In the above-mentioned shrinkage on curing, the organic fine particles preferably have the moderately adjusted resistance to the shrinkage on curing, of the fine particles. In order to adjust the resistance to the shrinkage, it is preferable to previously make a plurality of antiglare films containing organic fine particles made to have the varying degrees of three-dimensional crosslinking and having different hardnesses and to evaluate the concavo-convex geometries of the surfaces of the antiglare films, to thereby select the degree of crosslinking suitable for a specific concavo-convex surface.

In order to use inorganic oxide particles as fine particles, the inorganic oxide particles are preferably subjected to surface treatment. By subjecting the inorganic oxide fine particles to the surface treatment, distribution of the fine particles in a functional layer 12 can be preferably controlled and the chemical resistance and saponification resistance of the fine particles in themselves can also be improved.

As the surface treatment, hydrophobization treatment in which the surfaces of fine particles are imparted with hydrophobicity is preferable. Such hydrophobization treatment can be performed by chemically reacting the surfaces of fine particles with a surface treatment agent such as a silane or a silazane. Specific examples of the surface treatment agent include dimethyldichlorosilane, silicone oil, hexamethyldisilazane, octylsilane, hexadecylsilane, aminosilane, methacrylsilane, octamethylcyclotetrasiloxane, polydimethylsiloxane, and the like. When the fine particles are inorganic oxide fine particles, hydroxyl groups are present on the surface of the inorganic oxide fine particles. Such hydrophobization treatment as described above results in reduction in the number of hydroxyl groups present on the surfaces of the inorganic oxide fine particles and in the specific surface area of the inorganic oxide fine particles, measured by the BET method, as well as can result in suppression of excessive aggregation of the inorganic oxide fine particles and in formation of a functional layer having a specific concavo-convex surface.

When inorganic oxide particles are used as the fine particle, the inorganic oxide fine particles are preferably amorphous. This is because, when the inorganic oxide particles are crystalline, a Lewis acid salt of the inorganic oxide fine particles becomes stronger due to lattice defects contained in the crystal structure thereof and the excessive aggregation of the inorganic oxide fine particles might not be controlled.

The content of fine particles with respect to the antiglare layer is not particularly limited but is preferably 0.1% by mass or more and 5.0% by mass or less. Because the content of the fine particles is 0.1% by mass or more, a specific concavo-convex surface can be more surely formed. Further, because the content of the fine particles is 5.0% by mass or less, aggregates are not excessively generated, internal diffusion and/or generation of large concavities and convexities on the surface of the functional layer can be suppressed, and cloudiness can be therefore suppressed. The lower limit of the content of the fine particles is more preferably 0.5% by mass or more while the upper limit of the content of the fine particles is more preferably 3.0% by mass or less The fine particles preferably have spherical shapes in a single-particle state. Such a spherical single particle of the fine particles allows an image excellent in contrast when an optical film is placed on the image display surface of an image display apparatus. As used herein, "spherical shape" means those encompassing, e.g., true-spherical shapes, ellipsoidally spherical shapes, and the like, but not encompassing any so-called indefinite shapes.

When organic fine particles are used as the fine particles, the decrease of a refractive index difference between the organic fine particles and a binder resin to, e.g., less than 0.01, by changing the copolymerization ratio of the resin having a different refractive index is preferred in view of being able to suppress the diffusion of light due to the fine particles. The average primary particle diameter of the organic fine particles is preferably less than 8.0 μm, more preferably 5.0 μm or less.

The antiglare layer 62 illustrated in FIG. 9 is formed using the fine particles 65 which form a loose aggregate in the method (A) described above. "Loose aggregate" does not mean a lump aggregate of fine particles but means an aggregate having a structure including a bent portion 65A formed by linking primary particles and an interior region 65B sandwiched by the bent portion 65A. As used herein, "bent portion" is a concept encompassing a curved portion. Examples of shapes having the bent portion 65A include V shapes, U shapes, arc shapes, C shapes, coiled shapes, basket shapes, and the like. Both ends of the bent portion 65A may be closed, and for example, the fine particles 65 may have a ring structure having the bent portion 65A.

The bent portion 65A may be formed by linking the primary particles and composed of one bent aggregate of fine particles, may be composed of a trunk portion formed by linking primary particles and a branch portion which branches from the trunk portion and is formed by linking primary particles, or may be composed of two branch portions which branch from a trunk portion and are coupled in the trunk portion. The "trunk portion" described above is a portion which is the longest in an aggregate of fine particles.

The interior region 65B is filled with the binder resin 64. It is preferable that the bent portion 65A exists to sandwich the interior region 65B from the direction of the thickness of the antiglare layer 62.

Because an aggregate which aggregates in a lump form acts as a single solid during cure shrinkage (polymerization shrinkage) of a photopolymerizable compound which becomes a binder resin after cured, the concavo-convex surface of an antiglare layer corresponds to the geometry of the aggregate. In contrast, the aggregate in which the fine particles 65 loosely aggregate includes the bent portion 65A and the interior region 65B sandwiched by the bent portion 65A, and therefore acts as a solid having a buffer action during cure shrinkage. Thus, the aggregate in which the fine particles 65 loosely aggregate is easily and homogeneously deformed during the cure shrinkage. As a result, the geometry of the concavo-convex surface 62A is looser than that in a case in which fine particles aggregate in a lump form, and the partial generation of large concavities and convexities is inhibited.

As the fine particles forming the loose aggregate, for example, inorganic oxide fine particles having an average primary particle diameter of 1 nm or more and 100 nm or less are preferred. Because the average primary particle diameter of the fine particles is 1 nm or more, an antiglare layer having a specific concavo-convex surface can be more easily formed. In addition, because the average primary particle diameter is 100 nm or less, diffusion of light due to the fine particles can be suppressed, and excellent dark room contrast can be obtained. The lower limit of the average primary particle diameter of the fine particles is more preferably 5 nm or more, and the upper limit of the average primary particle diameter of the fine particles is more preferably 50 nm or less. The average primary particle diameter of the fine particles is a value measured using image processing software from an image by a cross-sectional electron microscope (preferably a transmission electron microscope, such as TEM or STEM, with a magnification of 50000 times or more).

When inorganic oxide fine particles are used as the fine particles forming loose aggregates, the average particle diameter of the aggregates of the inorganic oxide fine particles is preferably 100 nm or more and 2.0 μm or less. A specific concavo-convex surface can be easily formed in the case of 100 nm or more while, in the case of 2.0 μm or less, diffusion of light due to the aggregates of the fine particles can be suppressed, and an image display apparatus with an optical film excellent in dark room contrast can be obtained. The lower and upper limits of the average particle diameter of the aggregates of the fine particles are preferably 200 nm or more and 1.5 μm or less, respectively.

The average particle diameter of the aggregates of inorganic oxide fine particles is obtained by selecting a region of 5 μm in each direction, containing many aggregates of the inorganic oxide fine particles, by observation with a cross-sectional electron microscope (around 10000-20000-fold magnification), measuring the particle diameters of the aggregates of the inorganic oxide fine particles in the region, and averaging the particle diameters of the aggregates of the 10 top-ranked inorganic oxide fine particles. The above-described "particle diameter of aggregate of inorganic oxide fine particles", when the cross section of an aggregate of the inorganic oxide fine particles is sandwiched between two arbitrary parallel straight lines, is measured as a distance between the straight lines in such a combination of the two lines that the distance between the two straight lines is maximum. The particle diameter of an aggregate of the inorganic oxide fine particles may also be calculated using image analysis software.

When inorganic oxide fine particles are used as the fine particles forming a loose aggregate, concavities and convexities on a concavo-convex surface of an antiglare layer are preferably formed due to only the inorganic oxide fine particles. The phrase "concavities and convexities on concavo-convex surface of antiglare layer are formed due to only inorganic oxide fine particles" means that a case in which the concavities and convexities on the concavo-convex surface of the antiglare layer are formed due to the inorganic oxide fine particles and fine particles other than the inorganic oxide fine particles is substantially excluded. As used herein, the phrase "substantially excluded" means that the antiglare layer may contain the fine particles, which are fine particles that do not form the concavities and convexities on the concavo-convex surface of the antiglare layer or which are fine particles in a slight amount in which antiglare properties are not influenced even if the fine particles form the concavities and convexities, other than the inorganic oxide fine particles.

Among inorganic oxide fine particles, a fumed silica is particularly preferred from the viewpoint of enabling a loose aggregate to be formed and a specific concavo-convex surface to be easily formed. The fumed silica is an amorphous silica that is produced by a dry method and has a particle diameter of 200 nm or less and can be obtained by reacting a volatile compound containing silicon in a vapor phase. Specific examples thereof include a product obtained by hydrolyzing a silicon compound such as silicon tetrachloride ($SiCl_4$) in oxygen and hydrogen flames; and the like. Examples of commercially available products of fumed silica include AEROSIL R805, manufactured by NIPPON AEROSIL CO., LTD.; and the like.

Fumed silicas include fumed silicas exhibiting hydrophilicity and fumed silicas exhibiting hydrophobicity. Of these, the fumed silicas exhibiting hydrophobicity are preferred from the viewpoint of the reduced amount of absorbed water and facilitated dispersion in a composition for a functional layer. A hydrophobic fumed silica can be obtained by allowing silanol groups present on the surface of the fumed silica to chemically react with such a surface treatment agent as described above. The fumed silica is most preferably subjected to octylsilane treatment from the viewpoint of easily obtaining such an aggregate as described above.

It is preferable that the BET specific surface area of the fumed silica is 100 $m^2/g$ or more and 200 $m^2/g$ or less. The formation of an adequate aggregate is facilitated without excessive dispersion of the fumed silica by setting the BET specific surface area of the fumed silica at 100 $m^2/g$ or more. The fumed silica is inhibited from forming an excessively large aggregate by setting the BET specific surface area of the fumed silica at 200 $m^2/g$ or less. The lower limit of the BET specific surface area of the fumed silica is more preferably 120 $m^2/g$, still more preferably 140 $m^2/g$. The upper limit of the BET specific surface area of the fumed silica is more preferably 180 $m^2/g$, still more preferably 165 $m^2/g$.

Such an antiglare layer 62 can be formed, for example, by the following method. First, a composition for an antiglare layer described below is applied onto the surface of the light transmissive substrate 61. Examples of methods for applying a composition for an antiglare layer include known application methods such as spin coating, dip methods, spray methods, slide coating methods, bar coating methods, roll coating methods, gravure coating methods, and die coating methods.

A composition for an antiglare layer contains at least the above-described photopolymerizable compound and the above-described fine particles. In addition, the above-described thermoplastic resin, the above-described thermosetting resin, a solvent, or a polymerization initiator may be optionally added to the composition for an antiglare layer. Further, a dispersing agent, a surfactant, an antistatic agent, a silane coupling agent, a thickener, a coloring inhibitor, a coloring agent (a pigment, a dye), an antifoaming agent, a leveling agent, a flame retardant, an ultraviolet absorbing agent, an adhesion-imparting agent, a polymerization inhibitor, an oxidation inhibitor, a surface modifier, a lubricant, or the like, known in the art, may also be added to the composition for an antiglare layer depending on a purpose such as increase in the hardness of an antiglare layer, suppression of shrinkage on curing, or control of a refractive index.

(Solvent, Polymerization Initiator, Leveling Agent)

The description of the solvent, the polymerization initiator, and the leveling agent is omitted because the solvent, the polymerization initiator, and the leveling agent are similar to the solvent, the polymerization initiator, and the leveling agent described in the first embodiment.

When the mixture region 61A is formed in the vicinity of the interface between the light transmissive substrate 61 and the antiglare layer 62 as illustrated in FIG. 8, the solvent used contains a permeable solvent that has high permeability into the light transmissive substrate 61 and dissolves or swells the light transmissive substrate 61, and the photopolymerizable compound used contains at least a photopolymerizable monomer having a weight average molecular weight of 1000 or less. By using the permeable solvent and the photopolymerizable monomer, not only the permeable solvent but also the photopolymerizable monomer permeates the light transmissive substrate 61 and therefore the mixture region 61A in which the light transmissive substrate 61 is mixed with a resin containing the photopolymerizable monomer as a monomer unit can be formed in the vicinity of the interface between the light transmissive substrate 61 and the antiglare layer 62. The description of the permeable solvent is omitted because the permeable solvent is similar to the permeable solvent described in the first embodiment.

A method for preparing a composition for an antiglare layer is not particularly limited as long as each constituent can be homogeneously mixed, and the method can be carried out using a known apparatus such as a paint shaker, a bead mill, a kneader, or a mixer.

A composition for an antiglare layer is applied to the surface of the light transmissive substrate 61, followed by being transported to a heated zone to dry the coating film-like composition for an antiglare layer, and drying the composition for an antiglare layer by any of various known methods to evaporate a solvent. The state of distribution of fine particles can be adjusted by selecting a solvent relative evaporation rate, solid content concentration, coating liquid temperature, drying temperature, a drying wind velocity, drying time, solvent atmosphere concentration in a drying zone, and the like.

Particularly, the methods of adjusting the state of the distribution of fine particles by selecting drying conditions are simple and preferable. A specific drying temperature of 30 to 120° C. and a drying wind velocity of 0.2 to 50 m/s are preferred. The state of the distribution of the fine particles can be adjusted to a desired state by performing dry treatment, appropriately adjusted in this range, once or several times.

By drying the composition for an antiglare layer, the photopolymerizable compound remains in the light transmissive substrate although the permeable solvent that permeates the light transmissive substrate is evaporated.

Then, by irradiating the coating film-like composition for an antiglare layer with light such as ultraviolet light to polymerize (crosslink) the photopolymerizable compound, the composition for an antiglare layer is cured to form the antiglare layer 62 and to form the mixture region 61A.

When ultraviolet light is used as light for curing a composition for an antiglare layer, there can be used ultraviolet light emitted from ultra-high-pressure mercury lamps, high-pressure mercury lamps, low-pressure mercury lamps, carbon-arc, xenon-arc and metal halide lamps, and the like. Further, a wavelength region of 190 to 380 nm may be used for the wavelength of the ultraviolet light. Specific examples of electron beam sources include various electron beam accelerators such as Cockcroft-Walton, Van de Graaff, resonance transformer, insulated core transformer, linear, Dynamitron, and high-frequency accelerators.

Use of a photopolymerizable compound and a solvent drying type resin as materials for forming a binder resin also enables an antiglare layer having a specific concavo-convex surface to be formed. Specifically, for example, a composition for an antiglare layer containing the photopolymerizable compound, the solvent drying type resin, and fine particles is used to form a coating film of the composition for an antiglare layer on a light transmissive substrate by a method similar to the method described above and to cure the composition for an antiglare layer in a manner similar to the manner described above. In a case in which the photopolymerizable compound and the solvent drying type resin are used in combination as the materials for forming a binder resin, a concavo-convex surface of an antiglare layer can be formed without following the geometry of fine particles, and the specific concavo-convex surface can be formed, during drying and curing, because viscosity can be increased, and cure shrinkage (polymerization shrinkage) can be reduced, compared to a case in which only a photopolymerizable compound is used. However, it will be appreciated that it is necessary to appropriately adjust the film thickness of the antiglare layer, and the like even when the antiglare layer is formed in such a method because the concavo-convex geometry of the concavo-convex surface of the antiglare layer is influenced by the film thickness of the antiglare layer, and the like.

In the present embodiment, the antiglare layer 62 has a one-layer structure. However, the antiglare layer may have a multilayer structure with two or more layers if the expression (3) and expression (4) described above are satisfied. Specifically, the antiglare layer may have a two-layer structure including an undercoat concavo-convex layer of which a surface is a concavo-convex surface and a surface adjustment layer formed on the undercoat concavo-convex layer. The undercoat concavo-convex layer may be the antiglare layer 62. The surface adjustment layer is a layer for padding fine concavities and convexities present on the surface of the undercoat concavo-convex layer, to obtain a smooth concavo-convex surface, and/or for adjusting the spacings, sizes, and the like of the concavities and convexities present on the surface of the concavo-convex layer. The surface adjustment layer has a surface which is a concavo-convex surface, and the concavo-convex surface of the surface adjustment layer is a specific concavo-convex surface. However, in a case in which the antiglare layer has a multilayer structure, there is a fear that a production step is complicated, and it is difficult to control the production step in comparison with the case of a one-layer structure. Therefore, it is preferable that the antiglare layer has a one-layer structure.

From the viewpoint of adjusting concavities and convexities, it is preferable that the film thickness of the surface adjustment layer is 0.5 μm or more and 20 μm or less. The upper limit of the film thickness of the surface adjustment layer is preferably 12 μm or less, more preferably 8 μm or less. The lower limit of the film thickness of the surface adjustment layer is preferably 3 μm or more.

The antiglare layer including the undercoat concavo-convex layer and the surface adjustment layer can be formed by a method described below using a composition for an undercoat concavo-convex layer and a composition for a surface adjustment layer as compositions for an antiglare layer.

As the composition for an undercoat concavo-convex layer, a composition similar to the composition for an antiglare layer described in the section for the above-described composition for an antiglare layer can be used. As the composition for a surface adjustment layer, a composition including at least a photopolymerizable compound similar to the photopolymerizable compound described in the section for the above-described binder resin can be used. The composition for a surface adjustment layer may include a leveling agent, a solvent, and the like similar to the leveling agent and the solvent described in the sections for the above-described composition for an antiglare layer, as well as the photopolymerizable compound.

For forming the antiglare layer including the undercoat concavo-convex layer and the surface adjustment layer, first, the composition for an undercoat concavo-convex layer is applied onto a transmissive substrate, to form a coating film with the composition for an undercoat concavo-convex layer on the light transmissive substrate. The coating film is dried, followed by irradiating the coating film with light such as ultraviolet rays, to polymerize (crosslink) a photopolymerizable compound, whereby the composition for an undercoat concavo-convex layer is cured to form the undercoat concavo-convex layer. Then, the composition for a surface adjustment layer is applied onto the undercoat concavo-convex layer, to form a coating film with the composition for a surface adjustment layer. The coating film is dried, followed by irradiating the coating film with light such as ultraviolet rays, to polymerize (crosslink) a photopolymerizable compound, whereby the composition for a surface adjustment layer is cured to form the surface adjustment layer. As a result, the antiglare layer having a specific concavo-convex surface can be formed even if fine particles forming a loose aggregate are not used. However, it will be appreciated that it is necessary to appropriately adjust, e.g., the conditions of drying the coating film, and the film thicknesses of the undercoat concavo-convex layer and the surface adjustment layer even when the antiglare layer is formed in such a method because the concavo-convex geometry of the concavo-convex surface of the antiglare layer is also influenced by, e.g., the conditions of drying the coating film, and the film thicknesses of the undercoat concavo-convex layer and the surface adjustment layer.

<<Physical Properties of Antiglare Film>>

In the antiglare film 60, assuming that the transmission image sharpness of the antiglare film 60, measured using an optical comb with a width of 0.125 mm, is C (0.125), and that the transmission image sharpness of the antiglare film 10, measured using an optical comb with a width of 0.25 mm, is C (0.25), expressions (1) and (2) described below are preferably satisfied:

$$C(0.25)-C(0.125) \geq 2\% \quad (1); \text{ and}$$

$$C(0.125) \geq 65\% \quad (2).$$

The phrase "transmission image sharpness of antiglare film" means a transmission image sharpness measured for an entire antiglare film. In the present embodiment, the transmission image sharpness of the antiglare film 60 is a transmission image sharpness measured using the antiglare film 60 including the light transmissive substrate 61 and the antiglare layer 62 because a functional layer such as a low-refractive-index layer is not disposed on the antiglare layer 62. For example, when a functional layer such as a low-refractive-index layer is disposed on an antiglare layer in a manner similar to that in the fourth embodiment, the transmission image sharpness of an antiglare film is a transmission image sharpness measured using the antiglare film including a light transmissive substrate, the antiglare layer, and the functional layer.

A difference between a value of C (0.25) and a value of C (0.125) is preferably 3% or more, more preferably 4% or more. It is preferable that the value of C (0.125) is 75% or more. The value of C (0.125) is preferably 90% or less, more preferably 85% or less, still more preferably 80% or less, in view of securing antiglare properties.

The above-described transmission image sharpness can be measured by a transmission image sharpness measurement apparatus according to a transmission method for image sharpness in JIS K7374. Examples of such a measurement apparatus include an image clarity measuring device ICM-1T manufactured by Suga Test Instruments Co., Ltd.

The antiglare film 60 preferably has a total light transmittance of 85% or more. A total light transmittance of 85% or more can result in more improvement in color reproductivity and visibility when the antiglare film 60 is put on the surface of the image display apparatus. A total light transmittance of 90% or more is preferred. The total light transmittance can be measured by a method according to JIS K7361 using a haze meter (Instrument identification: HM-150, manufactured by MURAKAMI COLOR RESEARCH LABORATORY).

In the surface 60A of the antiglare film 60, the average spacing Sm of the concavities and convexities that constitute the surface 60A is preferably 0.1 mm or more and 0.8 mm or less, more preferably 0.3 mm or more and 0.6 mm or less. In the surface of the antiglare film, the average slope angle θa of the concavities and convexities that constitute the surface is preferably 0.01° or more and 0.1° or less, more preferably 0.03° or more and 0.08° or less.

In the surface 60A of the antiglare film 60, the maximum height roughness Ry of the concavities and convexities that constitute the surface 60A is preferably 0.1 μm or more and 0.8 μm or less, more preferably 0.3 μm or more and 0.6 μm or less. In the surface 60A of the antiglare film 60, the ten-point average roughness Rz of the concavities and convexities that constitute the surface 60A is preferably 0.1 μm or more and 0.7 μm or less, more preferably 0.2 μm or more and 0.5 μm or less.

The definitions of "Sm", "Ry", and "Rz" described above should comply with JIS B0601-1994. The definition of "θa" should comply with the instruction manual (revised on Jul. 20, 1995) of a surface roughness measuring instrument: SE-3400, manufactured by Kosaka Laboratory Ltd. Specifically, θa is represented by the above-described expression (6).

Sm, θa, Ry, and Rz can be measured, for example, using a surface roughness measuring instrument (model number: SE-3400, manufactured by Kosaka Laboratory Ltd.) under measurement conditions similar to the measurement conditions of the first embodiment.

According to the present embodiment, glare can be suppressed, and the contour of a reflected image can be blurred for the reasons described above even if the antiglare film 10 has a low total haze of 0% or more and 5% or less and a low internal haze of 0% or more and 5% or less, because Ra (100) and Ra (100-1000) of the surface 60A of the antiglare film 60 satisfy the expression (3) and expression (4) described above.

According to the present embodiment, glare can be more suppressed when the antiglare film 60 satisfies the expression (1) and expression (2) described above assuming that the transmission image sharpness of the antiglare film 60, measured using an optical comb with a width of 0.125 mm, is C (0.125), and that the transmission image sharpness of the antiglare film 60, measured using an optical comb with a width of 0.25 mm, is C (0.25).

When the antiglare layer 62 is formed using inorganic oxide fine particles having an average primary particle diameter of 1 nm or more and 100 nm or less (for example, fumed silica) as the fine particles, the antiglare film 60 having a lower total haze value (for example, a total haze value of 1% or less) and a lower internal haze value (for example, an internal haze value of substantially 0%) can be obtained. In other words, the total haze and internal haze of the antiglare film is the percentage of transmitted light deviating at 2.5 degrees or more from incident light due to forward scattering, to transmitted light transmitted through the antiglare film, and therefore, the total haze value and the internal haze are lowered if the percentage of transmitted light deviating at 2.5 degrees or more from incident light can be reduced. In contrast, the inorganic oxide fine particles having an average primary particle diameter of 100 nm or less form a loose aggregate without aggregating in a lump form in the antiglare layer 62, and therefore, light transmitted through the antiglare layer 62 is inhibited from diffusing in the antiglare layer 62. Thus, when the antiglare layer 62 is formed using the inorganic oxide fine particles having an average primary particle diameter of 1 nm or more and 100 nm or less, the generation of transmitted light deviating at 2.5 degrees or more from incident light can be suppressed, whereby the antiglare film 60 having a lower total haze value and a lower internal haze value can be obtained.

When the concavities and convexities on the concavo-convex surface 62A of the antiglare layer 62 are formed due to only the inorganic oxide fine particles, the concavo-convex surface 62A having loose and homogeneous concavities and convexities enabling antiglare properties to be obtained is easily formed. Therefore, the antiglare film 60 which has a low total haze value and a low internal haze value and enables glare to be further suppressed can be obtained.

According to the present embodiment, the antiglare film 60 has a total haze value of 0% or more and 5% or less and an internal haze value of 0% or more and 5% or less, and therefore, deterioration in luminance and light transmissiveness can be suppressed. Because diffusion of image light in the antiglare film 60 can be suppressed, part of image light does not become stray light. As a result, there is no fear that a dark room contrast is reduced, and there is no fear that an image blurs. As a result, the antiglare film 10 incorporated into a super-high-definition image display apparatus having 3000 or more horizontal pixels, such as 4K2K (3840 (the number of horizontal pixels)×2160 (the number of vertical pixels)), can be used.

According to the present embodiment, the antiglare film 60 includes the antiglare layer 62 having the concavo-convex surface 62A, and therefore, interference between light reflected on an interface between the light transmissive substrate 61 and the antiglare layer 62 and light reflected on the concavo-convex surface 62A of the antiglare layer 62 can be suppressed. As a result, generation of interference fringes can be suppressed. When the mixture region 61A is formed, reflection on the interface between the light transmissive substrate 61 and the antiglare layer can be suppressed, and therefore, the generation of interference fringes can be more suppressed.

When the concavities and convexities on the concavo-convex surface 62A of the antiglare layer 62 are formed due to only the inorganic oxide fine particles, it also becomes easy to prevent the slope angles of the concavities and convexities forming the concavo-convex surface 62A from increasing. As a result, excessive diffusion of extraneous light does not occur, and therefore, reduction in bright room contrast can be suppressed. Because image light can also be prevented from becoming stray light, a favorable dark room contrast can also be provided. Furthermore, in the case of displaying a dynamic image, the gloss and brightness of the image are increased to be able to provide dynamism, due to an adequate regular reflection component. As a result, black color feeling including both of an excellent contrast and excellent dynamism can be provided.

A method for improving glare can also be provided by the antiglare film satisfying the expressions (3) and (4) described above.

<<Polarizing Plate, Liquid Crystal Panel, Image Display Apparatus>>

Figure 10:
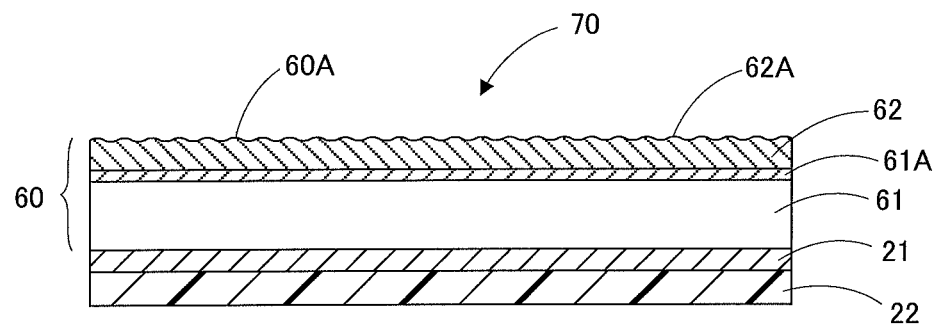
FIG. 10 is a schematic view illustrating the configuration of a polarizing plate according to the third embodiment.
Figure 11:
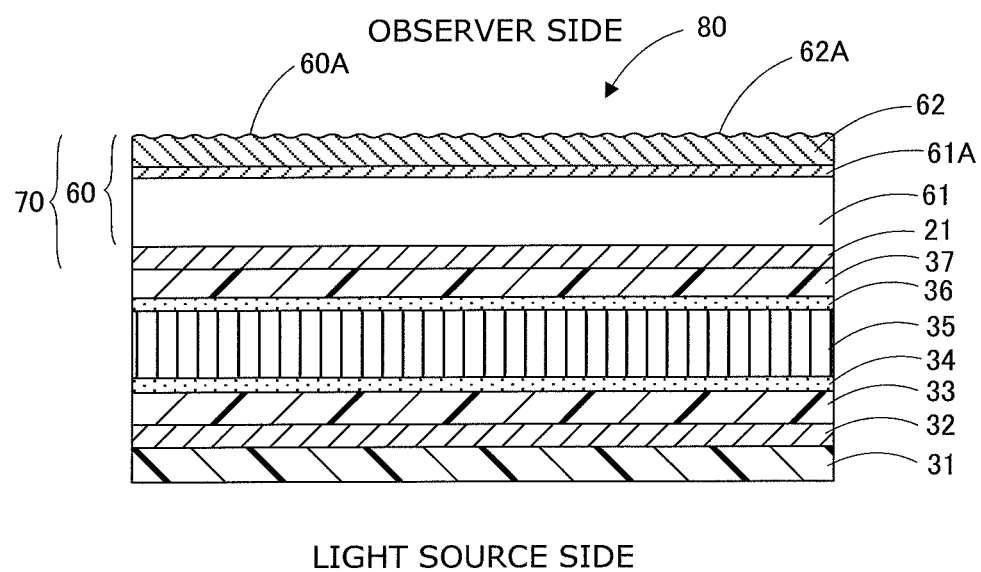
FIG. 11 is a schematic view illustrating the configuration of a liquid crystal panel according to the third embodiment.
Figure 12:
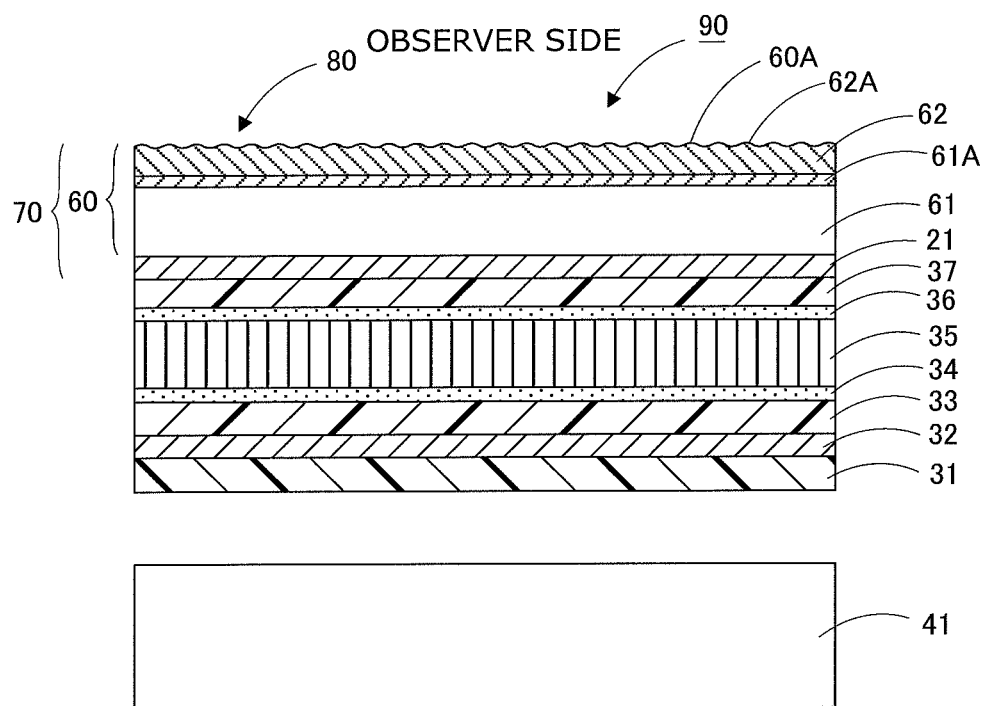
FIG. 12 is a schematic view illustrating the configuration of a liquid crystal display which is an example of an image display apparatus according to the third embodiment.

As illustrated in FIG. 10 to FIG. 12, the antiglare film 60 may be incorporated, for example, into a polarizing plate 70, a liquid crystal panel 80, and an image display apparatus 90, and be used, in a manner similar to that in the first embodiment. In FIGS. 10 to 12, members denoted by reference characters similar to those in FIG. 4 to FIG. 6 mean members similar to the members described in the first embodiment.

Fourth Embodiment

Figure 13:
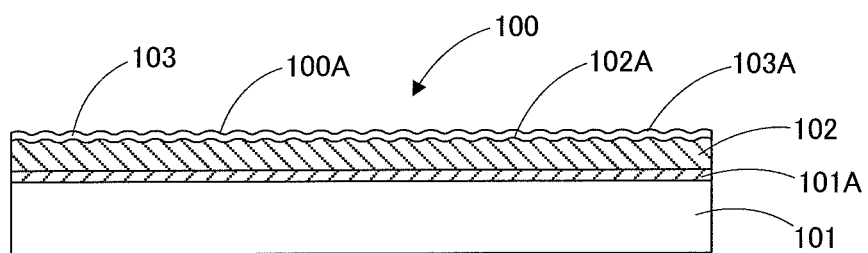
FIG. 13 is a schematic view illustrating the configuration of an antiglare film according to a fourth embodiment.

An antiglare film according to a fourth embodiment of the present invention will be described below with reference to the drawings. In the fourth embodiment, a content overlapping with that in the third embodiment should be omitted unless otherwise specified. FIG. 13 is a schematic view illustrating the configuration of the antiglare film according to the present embodiment.

<<Antiglare Film>>

As illustrated in FIG. 13, an antiglare film 100 includes at least a light transmissive substrate 101, an antiglare layer 102 that is disposed on the light transmissive substrate 101 and includes a concavo-convex surface 102A, and a functional layer 103 disposed on the antiglare layer 102. The description of the light transmissive substrate 101 should be omitted in the present embodiment because the light transmissive substrate 101 is similar to the light transmissive substrate 61 described in the third embodiment. In the vicinity of the interface between the light transmissive substrate 61 and the antiglare layer 62, it is preferable to form a mixture region 101A in which the light transmissive substrate 61 and the constituent of the binder resin of the antiglare layer 62 are mixed as illustrated in FIG. 13.

A surface 100A of the antiglare film 100 is a concavo-convex surface. In the present embodiment, a surface 103A of the functional layer 103 is the surface 100A of the antiglare film 100 because the functional layer 103 is disposed on the antiglare layer 102.

The antiglare film 100 has a total haze value of 0% or more and 5% or less and an internal haze value of 0% or more and 5% or less. The antiglare film 100 preferably has a total haze value of 1% or less, more preferably 0.3% or more and 0.5% or less. It is preferable that the internal haze value is substantially 0%.

When the antiglare film 100 has a total haze value of 0% or more and 5% or less and an internal haze value of 0% or more and 5% or less, the antiglare film 100 has a surface haze value of 0% or more and 5% or less. The antiglare film 100 preferably has a surface haze value of 0% or more and 1% or less, more preferably 0% or more and 0.3% or less.

Assuming that the surface 100A of the antiglare film 100 has an arithmetic mean roughness of Ra (100) [μm] at a long wavelength cutoff wavelength of 100 μm and that the surface 100A of the antiglare film 100 has an arithmetic mean roughness of Ra (100-1000) [μm] at a short wavelength cutoff wavelength of 100 μm and at a long wavelength cutoff wavelength of 1000 μm, the antiglare film 100 satisfies the following expression (3) and expression (4):

$$Ra(100)/Ra(100-1000) \leq 0.5 \quad (3); \text{ and}$$

$$0.04 \ \mu m \leq Ra(100-1000) \leq 0.12 \ \mu m \quad (4).$$

Ra (100) of the surface 100A of the antiglare film 100 preferably satisfies an expression (10) described below from the viewpoint of more suppressing glare. Ra (100) may be 0 μm.

$$Ra(100) \leq 0.03 \ \mu m \quad (10)$$

The lower limit of Ra (100-1000) is preferably 0.045 μm or more, more preferably 0.05 μm or more. The upper limit of Ra (100-1000) is preferably 0.1 μm or less, more preferably 0.08 μm or less.

In the present embodiment, the concavo-convex geometry of the surface 100A of the antiglare film 100 and the concavo-convex geometry of the concavo-convex surface 102A of the antiglare layer 102 may be different if the concavo-convex geometry in the surface 100A of the antiglare film 100 satisfies the above (3) and (4). When a low-refractive-index layer is used as the functional layer 103, the concavo-convex geometry of the concavo-convex surface of the antiglare layer is maintained in the nearly as-is status thereof on a surface of the low-refractive-index layer because the low-refractive-index layer has a small film thickness. Thus, the concavo-convex geometry of the surface 100A of the antiglare film 100 (surface 103A of functional layer 103) is substantially the concavo-convex geometry of the concavo-convex surface 102A of the antiglare layer 102. A case in which the low-refractive-index layer is used as the functional layer 103 will be described below.

It is preferable that the antiglare film 100 has physical properties similar to the physical properties described in the section for the physical properties of the above-described antiglare film.

<Antiglare Layer>

The description of the antiglare layer 102 should be omitted in the present embodiment because the antiglare layer 102 is similar to the antiglare layer 62 described in the third embodiment.

<Low-Refractive-Index Layer>

The description of the low-refractive-index layer should be omitted in the present embodiment because the low-refractive-index layer is similar to the low-refractive-index layer 53 described in the second embodiment.

According to the present embodiment, glare can be suppressed, and the contour of a reflected image can be blurred for the reasons described above even if the antiglare film 100 has a low total haze of 0% or more and 5% or less and a low internal haze of 0% or more and 5% or less, because Ra (100) and Ra (100-1000) of the surface 100A of the antiglare film 100 satisfy the expression (3) and expression (4) described above.

According to the present embodiment, the extraneous light reflectance of the antiglare film 100 can be reduced when the low-refractive-index layer is formed as the functional layer 103 on the antiglare layer 102. Because the extraneous light reflectance is reduced, the light transmittance of the antiglare film 50 is relatively increased, whereby the light transmittance of the antiglare film 100 can be improved.

EXAMPLES

The present invention will be described below with reference to Examples in order to described the present invention in detail but the present invention is not limited to the description thereof.

Example A

<Preparation of Composition for Antiglare Layer>

First, each constituent was blended to obtain a composition for an antiglare layer to have the following composition:

(Composition A1 for Antiglare Layer)

Silica fine particles (octylsilane-treated fumed silica, average primary particle diameter of 12 nm, manufactured by NIPPON AEROSIL CO., LTD.): 0.5 part by mass Silica fine particles (methylsilane-treated fumed silica, average primary particle diameter of 12 nm, manufactured by NIPPON AEROSIL CO., LTD.): 0.2 part by mass Pentaerythritol tetraacrylate (PETTA) (product name "PETA", manufactured by Daicel-Cytec Co., Ltd.): 50 parts by mass Urethane acrylate (product name "V-4000BA", manufactured by DIC Corporation): 50 parts by mass Polymerization initiator (IRGACURE 184, manufactured by BASF Japan Ltd.): 5 parts by mass Polyether-modified silicone (product name "TSF4460", manufactured by Momentive Performance Materials Inc.): 0.025 part by mass Toluene: 70 parts by mass Isopropyl alcohol: 40 parts by mass Cyclohexanone: 40 parts by mass (Composition A2 for Antiglare Layer)

Silica fine particles (octylsilane-treated fumed silica, average primary particle diameter of 12 nm, manufactured by NIPPON AEROSIL CO., LTD.): 0.3 part by mass Silica fine particles (methylsilane-treated fumed silica, average primary particle diameter of 12 nm, manufactured by NIPPON AEROSIL CO., LTD.): 0.5 part by mass Pentaerythritol tetraacrylate (PETTA) (product name "PETA", manufactured by Daicel-Cytec Co., Ltd.): 50 parts by mass Urethane acrylate (product name "V-4000BA", manufactured by DIC Corporation): 50 parts by mass Polymerization initiator (IRGACURE 184, manufactured by BASF Japan Ltd.): 5 parts by mass Polyether-modified silicone (product name "TSF4460", manufactured by Momentive Performance Materials Inc.): 0.025 part by mass Toluene: 70 parts by mass Isopropyl alcohol: 40 parts by mass Cyclohexanone: 40 parts by mass (Composition A3 for Antiglare Layer)
  Silica fine particles (octylsilane-treated fumed silica, average primary particle diameter of 12 nm, manufactured by NIPPON AEROSIL CO., LTD.): 0.7 part by mass
  Silica fine particles (methylsilane-treated fumed silica, average primary particle diameter of 12 nm, manufactured by NIPPON AEROSIL CO., LTD.): 0.2 part by mass
  Pentaerythritol tetraacrylate (PETTA) (product name "PETA", manufactured by Daicel-Cytec Co., Ltd.): 50 parts by mass
  Urethane acrylate (product name "V-4000BA", manufactured by DIC Corporation): 50 parts by mass
  Polymerization initiator (IRGACURE 184, manufactured by BASF Japan Ltd.): 5 parts by mass
  Polyether-modified silicone (product name "TSF4460", manufactured by Momentive Performance Materials Inc.): 0.025 part by mass
  Toluene: 70 parts by mass
  Isopropyl alcohol: 40 parts by mass
  Cyclohexanone: 40 parts by mass
(Composition A4 for Antiglare Layer)
  Spherical acrylic/styrene copolymer beads (refractive index of 1.52, average primary particle diameter of 5 μm, manufactured by SEKISUI PLASTICS CO., Ltd.): 4 parts by mass
  Isocyanuric acid EO-modified diacrylate (product name "M-215", manufactured by Toagosei Co., Ltd.): 50 parts by mass
  PMMA resin (solvent drying type resin, molecular weight of 75,000, manufactured by MITSUBISHI RAYON CO., LTD.): 50 parts by mass
  Polymerization initiator (IRGACURE 184, manufactured by BASF Japan Ltd.): 3 parts by mass
  Polyether-modified silicone (product name "TSF4460", manufactured by Momentive Performance Materials Inc.): 0.025 part by mass
  Toluene: 70 parts by mass
  Isopropyl alcohol: 40 parts by mass
  Cyclohexanone: 40 parts by mass
(Composition A5 for Antiglare Layer)
(1) Composition for Undercoat Concavo-Convex Layer
  Spherical acrylic/styrene copolymer beads (refractive index of 1.52, average primary particle diameter of 5 μm, manufactured by SEKISUI PLASTICS CO., Ltd.): 8 parts by mass
  Pentaerythritol tetraacrylate (PETTA) (product name "PETA", manufactured by Daicel-Cytec Co., Ltd.): 50 parts by mass
  Urethane acrylate (product name "V-4000BA", manufactured by DIC Corporation): 50 parts by mass
  Polymerization initiator (IRGACURE 184, manufactured by BASF Japan Ltd.): 5 parts by mass
  Polyether-modified silicone (product name "TSF4460", manufactured by Momentive Performance Materials Inc.): 0.015 part by mass
  Toluene: 70 parts by mass
  Isopropyl alcohol: 40 parts by mass
  Cyclohexanone: 40 parts by mass
(2) Composition for Surface Adjustment Layer
  Pentaerythritol tetraacrylate (PETTA) (product name "PETA", manufactured by Daicel-Cytec Co., Ltd.): 50 parts by mass
  Urethane acrylate (product name "V-4000BA", manufactured by DIC Corporation): 50 parts by mass
  Polymerization initiator (IRGACURE 184, manufactured by BASF Japan Ltd.): 5 parts by mass
  Polyether-modified silicone (product name "TSF4460", manufactured by Momentive Performance Materials Inc.): 0.035 part by mass
  Toluene: 110 parts by mass
  Cyclohexanone: 40 parts by mass
(Composition A6 for Antiglare Layer)
  Silica fine particles (octylsilane-treated fumed silica, average primary particle diameter of 12 nm, manufactured by NIPPON AEROSIL CO., LTD.): 0.5 part by mass
  Silica fine particles (methylsilane-treated fumed silica, average primary particle diameter of 12 nm, manufactured by NIPPON AEROSIL CO., LTD.): 0.2 part by mass
  Pentaerythritol tetraacrylate (PETTA) (product name "PETA", manufactured by Daicel-Cytec Co., Ltd.): 50 parts by mass
  Urethane acrylate (product name "V-4000BA", manufactured by DIC Corporation): 50 parts by mass
  Polymerization initiator (IRGACURE 184, manufactured by BASF Japan Ltd.): 5 parts by mass
  Polyether-modified silicone (product name "TSF4460", manufactured by Momentive Performance Materials Inc.): 0.025 part by mass
  Toluene: 90 parts by mass
  Isopropyl alcohol: 20 parts by mass
  Cyclohexanone: 40 parts by mass
(Composition A7 for Antiglare Layer)
  Silica fine particles (octylsilane-treated fumed silica, average primary particle diameter of 12 nm, manufactured by NIPPON AEROSIL CO., LTD.): 0.7 part by mass
  Pentaerythritol tetraacrylate (PETTA) (product name "PETA", manufactured by Daicel-Cytec Co., Ltd.): 50 parts by mass
  Urethane acrylate (product name "V-4000BA", manufactured by DIC Corporation): 50 parts by mass
  Polymerization initiator (IRGACURE 184, manufactured by BASF Japan Ltd.): 5 parts by mass
  Polyether-modified silicone (product name "TSF4460", manufactured by Momentive Performance Materials Inc.): 0.025 part by mass
  Toluene: 90 parts by mass
  Isopropyl alcohol: 20 parts by mass
  Cyclohexanone: 40 parts by mass
(Composition A8 for Antiglare Layer)
  Spherical acrylic/styrene copolymer beads (refractive index of 1.52, average primary particle diameter of 5 μm, manufactured by SEKISUI PLASTICS CO., Ltd.): 4 parts by mass
  Pentaerythritol tetraacrylate (PETTA) (product name "PETA", manufactured by Daicel-Cytec Co., Ltd.): 70 parts by mass
  Isocyanuric acid EO-modified diacrylate (product name "M-215", manufactured by Toagosei Co., Ltd.): 30 parts by mass
  Polymerization initiator (IRGACURE 184, manufactured by BASF Japan Ltd.): 3 parts by mass
  Polyether-modified silicone (product name "TSF4460", manufactured by Momentive Performance Materials Inc.): 0.025 part by mass
  Toluene: 70 parts by mass
  Isopropyl alcohol: 40 parts by mass
  Cyclohexanone: 40 parts by mass (Composition A9 for Antiglare Layer)
(1) Composition for Undercoat Concavo-Convex Layer
　Spherical acrylic/styrene copolymer beads (refractive index of 1.52, average primary particle diameter 5 μm, manufactured by SEKISUI PLASTICS CO., Ltd.): 10 parts by mass
　Pentaerythritol tetraacrylate (PETTA) (product name "PETA", manufactured by Daicel-Cytec Co., Ltd.): 50 parts by mass
　Urethane acrylate (product name "V-4000BA", manufactured by DIC Corporation): 50 parts by mass
　Polymerization initiator (IRGACURE 184, manufactured by BASF Japan Ltd.): 5 parts by mass
　Polyether-modified silicone (product name "TSF4460", manufactured by Momentive Performance Materials Inc.): 0.015 part by mass
　Toluene: 70 parts by mass
　Isopropyl alcohol: 40 parts by mass
　Cyclohexanone: 40 parts by mass
(2) Composition for Surface Adjustment Layer
　Pentaerythritol tetraacrylate (PETTA) (product name "PETA", manufactured by Daicel-Cytec Co., Ltd.): 50 parts by mass
　Urethane acrylate (product name "V-4000BA", manufactured by DIC Corporation): 50 parts by mass
　Polymerization initiator (IRGACURE 184, manufactured by BASF Japan Ltd.): 5 parts by mass
　Polyether-modified silicone (product name "TSF4460", manufactured by Momentive Performance Materials Inc.): 0.035 part by mass
　Toluene: 110 parts by mass
　Cyclohexanone: 40 parts by mass
(Composition A10 for Antiglare Layer)
　Spherical acrylic/styrene copolymer beads (refractive index of 1.52, average primary particle diameter of 5 μm, manufactured by SEKISUI PLASTICS CO., Ltd.): 5 parts by mass
　Isocyanuric acid EO-modified diacrylate (product name "M-215", manufactured by Toagosei Co., Ltd.): 50 parts by mass
　PMMA resin (solvent drying type resin, molecular weight of 75,000, manufactured by MITSUBISHI RAYON CO., LTD.): 50 parts by mass
　Polymerization initiator (IRGACURE 184, manufactured by BASF Japan Ltd.): 3 parts by mass
　Polyether-modified silicone (product name "TSF4460", manufactured by Momentive Performance Materials Inc.): 0.025 part by mass
　Toluene: 70 parts by mass
　Isopropyl alcohol: 40 parts by mass
　Cyclohexanone: 40 parts by mass
<Preparation of Composition for Low-Refractive-Index Layer>
　Each constituent was blended to obtain a composition A for a low-refractive-index layer to have the following composition.
(Composition a for Low-Refractive-Index Layer)
　Hollow silica fine particles (solid content of the hollow silica fine particle: 20% by mass, solution: methyl isobutyl ketone, average particle diameter: 50 nm): 40 parts by mass
　Pentaerythritol triacrylate (PETA) (product name: PETIA, manufactured by Daicel-Cytec Co., Ltd.): 10 parts by mass
　Polymerization initiator (IRGACURE 127; manufactured by BASF Japan Ltd.): 0.35 part by mass
　Modified silicone oil (X22164E, manufactured by Shin-Etsu Chemical Co., Ltd.): 0.5 part by mass
　Methyl isobutyl ketone (MIBK): 320 parts by mass
　Propylene glycol monomethyl ether acetate (PGMEA): 161 parts by mass Example A1

A triacetylcellulose resin film (TD60UL, manufactured by FUJIFILM Corporation) with a thickness of 60 μm as a light transmissive substrate was prepared, and the composition A1 for an antiglare layer was applied to one surface of the triacetylcellulose resin film to form a coating film. Then, a solvent in the coating film was evaporated by circulating dry air at 50° C. to the formed coating film at a flow rate of 0.2 m/s for 15 seconds and thereafter further circulating dry air at 70° C. at a flow rate of 10 m/s for 30 seconds to dry the coating film, and an antiglare layer of 4 μm in thickness (when cured) was formed to produce an antiglare film according to Example A1 by irradiating the coating film with ultraviolet light under nitrogen atmosphere (oxygen concentration of 200 ppm or less) so that the integrated amount of the light was 100 mJ/cm$^2$ to cure the coating film.

Example A2

In Example A2, an antiglare film was produced in the same manner as in Example A1 except that dry air at 70° C. was circulated for 15 seconds at a flow rate of 1.0 m/s, and thereafter, dry air at 70° C. was further circulated for 30 seconds at a flow rate of 10 m/s, as drying conditions.

Example A3

In Example A3, an antiglare film was produced in the same manner as in Example A1 except that the composition A2 for an antiglare layer was used instead of the composition A1 for an antiglare layer.

Example A4

In Example A4, an antiglare film was produced in the same manner as in Example A1 except that dry air at 70° C. was circulated for 15 seconds at a flow rate of 5.0 m/s, and thereafter, dry air at 70° C. was circulated for 30 seconds at a flow rate of 10 m/s, as drying conditions, using the composition A3 for an antiglare layer instead of the composition A1 for an antiglare layer.

Example A5

In Example A5, an antiglare film was produced in the same manner as in Example A1 except that a thickness in curing was 5 μm using the composition A4 for an antiglare layer instead of the composition A1 for an antiglare layer.

Example A6

In Example A6, a triacetylcellulose resin film (TD60UL, manufactured by FUJIFILM Corporation) with a thickness of 60 μm as a light transmissive substrate was prepared, and the composition for an undercoat concavo-convex layer of the composition A5 for an antiglare layer was applied to one surface of the triacetylcellulose resin film to form a coating film. Then, a solvent in the coating film was evaporated by circulating dry air at 70° C. to the formed coating film at a flow rate of 1.0 m/s for 15 seconds and thereafter further circulating dry air at 70° C. at a flow rate of 10 m/s for 30 seconds to dry the coating film, and an undercoat concavo-convex layer of 3 μm in thickness (when cured) was formed by irradiating the coating film with ultraviolet light under nitrogen atmosphere (oxygen concentration of 200 ppm or less) so that the integrated amount of the light was 50 mJ/cm$^2$ to cure the coating film. Furthermore, the composition for a surface adjustment layer of the composition A5 for an antiglare layer was applied to the undercoat concavo-convex layer to form a coating film, a solvent in the coating film was evaporated by circulating dry air at 70° C. at a flow rate of 1.0 m/s for 15 seconds and thereafter further circulating dry air at 70° C. at a flow rate of 10 m/s for 30 seconds to dry the coating film, and a surface adjustment layer was formed by irradiating the coating film with ultraviolet light under nitrogen atmosphere (oxygen concentration of 200 ppm or less) so that the integrated amount of the light was 100 mJ/cm$^2$ to cure the coating film. An antiglare layer was formed so that the total thickness of the undercoat concavo-convex layer and the surface adjustment layer was 6 μm (when cured), to produce an antiglare film according to Example A6.

Example A7

In Example A7, an antiglare layer was formed on a triacetylcellulose resin film in the same manner as in Example A1 except that the integrated amount of ultraviolet light was 50 mJ/cm$^2$. Then, the composition A for a low-refractive-index layer was applied to a surface of the antiglare layer so that the film thickness thereof was 0.1 μm after drying (40° C.×1 min), and irradiated with ultraviolet light at an integrated amount of the light of 100 mJ/cm$^2$ under nitrogen atmosphere (oxygen concentration of 200 ppm or less), to cure the composition, and a low-refractive-index layer was formed to produce an optical film according to Example A7.

Comparative Example A1

In Comparative Example A1, an antiglare film was produced in the same manner as in Example A1 except that dry air at 50° C. was circulated for 15 seconds at a flow rate of 1.0 m/s, and thereafter, dry air at 70° C. was further circulated for 30 seconds at a flow rate of 10 m/s, as drying conditions, using the composition A6 for an antiglare layer instead of the composition A1 for an antiglare layer.

Comparative Example A2

In Comparative Example A2, an antiglare film was produced in the same manner as in Example A1 except that the composition A7 for an antiglare layer was used instead of the composition A1 for an antiglare layer.

Comparative Example A3

In Comparative Example A3, an antiglare film was produced in the same manner as in Example A1 except that the composition A6 for an antiglare layer was used instead of the composition A1 for an antiglare layer.

Comparative Example A4

In Comparative Example A4, an antiglare film was produced in the same manner as in Example A1 except that the composition A8 for an antiglare layer was used instead of the composition A1 for an antiglare layer, and a thickness in curing was 4.5 μm Comparative Example A5

In Comparative Example A5, an antiglare film was produced in the same manner as in Example A6 except that the composition A9 for an antiglare layer was used instead of the composition A5 for an antiglare layer.

Comparative Example A6

In Comparative Example A6, an antiglare film was produced in the same manner as in Example A1 except that the composition A10 for an antiglare layer was used instead of the composition A1 for an antiglare layer, and a thickness in curing was 5 μm.

<Measurement of Transmission Image Sharpness>

The transmission image sharpness of each of the antiglare films obtained in Examples A1 to A7 and Comparative Examples A1 to A6 was measured as described below. First, an image clarity measuring device (model number: ICM-1T, manufactured by Suga Test Instruments Co., Ltd.) was prepared. Each of the antiglare films according to Examples A1 to A7 and Comparative Examples A1 to A6 was disposed so that a triacetylcellulose resin film side is closer to the light source of the image clarity measuring device. The transmission image sharpness thereof was measured according to a method for measuring image sharpness by a transmission method in HS K7374. Optical combs with a width of 0.125 mm and with a width of 0.25 mm were used. A difference (C (0.25)–C (0.125)) between a transmission image sharpness (C (0.25)) measured using the optical comb with a width of 0.25 mm and a transmission image sharpness (C (0.125)) measured using the optical comb with a width of 0.125 mm was determined. For reference, the transmission image sharpness of each of the antiglare films according to Examples A1 to A7 and Comparative Examples A1 to A6 was measured in a manner similar to the manner described above using optical combs with a width of 0.5 mm, a width of 1.0 mm, and a width of 2.0 mm, to determine the sum of the transmission image sharpness (C (0.125)) measured using the optical comb with a width of 0.125 mm, the transmission image sharpness (C (0.5)) measured using the optical comb with a width of 0.5 mm, the transmission image sharpness (C (1.0)) measured using the optical comb with a width of 1.0 mm, and the transmission image sharpness (C (2.0)) measured using the optical comb with a width of 2.0 mm.

<Glare Evaluation (1)>

A glass plate (having a thickness of 3 mm) was affixed, with a transparent adhesive, to a surface, on which an antiglare layer is not formed, of each of the antiglare films obtained in Examples A1 to A7 and Comparative Examples A1 to A6. Furthermore, a glass surface, to which the antiglare film was not affixed, of the glass plate and a glass surface, on which a matrix was not formed, of a black matrix of 350 ppi (having a glass thickness of 0.7 mm) were affixed to each other with water. A white surface light source (LIGHTBOX manufactured by HAKUBA, average luminance of 1000 cd/m$^2$) was disposed in a place closer to the black matrix, to allow a sample obtained in such a manner to artificially generate glare. The glare was photographed with a CCD camera (KP-M1, C-mount adaptor, extension tube (PK-11A, NIKON CORPORATION), camera lens (50 mm, F 1.4s, NIKKOR)) from a place closer to the antiglare film. The distance between the CCD camera and the antiglare film was set at 250 mm, and the CCD camera was regulated to be focused on the antiglare film. An image obtained by photographing with the CCD camera was captured into a personal computer and analyzed with image processing software (ImagePro Plus ver. 6.2; manufactured by Media Cybernetics) as described below. First, an evaluation spot of 200×160 pixels was selected from the captured image, and the evaluation spot was converted into 16-bit gray scale. Then, a low-pass filter was selected from the highlighting tab of a filter command, and filtering was performed under conditions of 3×3, the number of times of 3, and a strength of 10, whereby components derived from a black matrix pattern were removed. Then, flattening was selected, and shading compensation was performed under conditions of background: dark and an object width of 10. Then, contrast: 96 and brightness: 48 were set in a contrast enhancement command, to perform contrast enhancement. The obtained image was converted into 8-bit gray scale, in which the dispersion of the values of 150×110 pixels was calculated as a standard deviation value for each pixel, to thereby convert glare into a number. It may be considered that the less value into which the glare was converted means less glare.

<Glare Evaluation (2)>

The glare of each of the antiglare films obtained in Examples A1 to A7 and Comparative Examples A1 to A6 was evaluated as described below. A light box (white surface light source) with a luminance of 1500 cd/m$^2$, black matrix glass of 350 ppi, and the antiglare film were allowed to be in the state of being stacked in the order mentioned from the bottom, and 15 subjects performed visual evaluation at a distance of around 30 cm from various angles from side to side and up and down. Whether or not they were annoyed by glare was determined and evaluated based on the following criteria:

Excellent: 13 or more subjects answer that it is favorable;
Good: 10 to 12 subjects answer that it is favorable;
Fair: 7 to 9 subjects answer that it is favorable; and
Poor: 6 or less subjects answer that it is favorable.

<Measurement of Total Haze, Internal Haze, and Surface Haze>

The total haze, internal haze, and surface haze of each of the antiglare films obtained in Examples A1 to A7 and Comparative Examples A1 to A6 described above were measured as described below. First, the total haze value of the antiglare film was measured according to JIS K7136 using a haze meter (HM-150, manufactured by MURAKAMI COLOR RESEARCH LABORATORY). Then, a triacetylcellulose substrate (TD60UL, manufactured by FUJIFILM Corporation) was affixed to the surface of the antiglare layer via a transparent optical adhesive layer. As a result, the concavo-convex geometry of the concavo-convex surface of the antiglare layer was deformed, whereby the surface of the antiglare film became flat. In this state, the internal haze value was determined by measuring a haze value according to JIS K7136 using the haze meter (HM-150, manufactured by MURAKAMI COLOR RESEARCH LABORATORY). The surface haze value was determined by subtracting the internal haze value from the total haze value.

<Measurement of Sm, θa, Ra, Ry, and Rz>

Sm, θa, Ra, Ry, and Rz were measured on a surface (a surface of an antiglare layer in the absence of a low-refractive-index layer or a surface of a low-refractive-index layer in the presence of the low-refractive-index layer) of each of the antiglare films obtained in Examples A1 to A7 and Comparative Examples A1 to A6. The definitions of Sm, Ra, Ry, and Rz should comply with JIS B0601-1994, and θa should comply with the instruction manual (revised on Jul. 20, 1995) of a surface roughness measuring instrument: SE-3400, manufactured by Kosaka Laboratory Ltd.

Specifically, Sm, θa, Ra, Ry, and Rz were measured using a surface roughness measuring instrument (model number: SE-3400, manufactured by Kosaka Laboratory Ltd.) under the following measurement conditions:

1) Tracer in Surface Roughness Detector (trade name: SE2555N (standard 2 μm), manufactured by Kosaka Laboratory Ltd.)

Radius of curvature in tip: 2 μm, apex angle: 90 degrees, material: diamond

2) Measurement Conditions for Surface Roughness Measuring Instrument

Reference length (cutoff value λc of roughness curve): 2.5 mm
Evaluation length (reference length (cutoff value λc)×5): 12.5 mm
Feed speed of tracer: 0.5 mm/s
Preliminary length: (cutoff value λc)×2
Longitudinal magnification: 2000 times
Lateral magnification: 10 times The results are listed in Table 1 and Table 2 below.

TABLE 1

| | Composition for Antiglare Layer | C(0.125) (%) | C(0.25) (%) | C(0.5) (%) | C(1.0) (%) | C(2.0) (%) | C(0.25) − C(0.125) (%) | Sum (%) of Four Transmission Image Sharpnesses | Glare Evaluation 1 | Glare Evaluation 2 |
|---|---|---|---|---|---|---|---|---|---|---|
| Example A1 | A1 | 71.8 | 75.9 | 87.3 | 95.9 | 98.8 | 4.1 | 353.8 | 10 | Excellent |
| Example A2 | A1 | 79.6 | 82.9 | 89.1 | 96.3 | 98.9 | 3.3 | 363.9 | 10 | Excellent |
| Example A3 | A2 | 75.0 | 79.5 | 88.3 | 96.2 | 98.8 | 4.5 | 358.3 | 9 | Excellent |
| Example A4 | A3 | 73.1 | 75.6 | 87.6 | 95.6 | 98.7 | 2.5 | 355.0 | 12 | Good |
| Example A5 | A4 | 67.1 | 69.3 | 78.9 | 87.6 | 90.3 | 2.2 | 323.0 | 14 | Fair |
| Example A6 | A5 | 66.5 | 70.4 | 82.3 | 88.9 | 92.5 | 3.9 | 330.2 | 13 | Good |
| Example A7 | A1 | 73.4 | 78.0 | 87.9 | 96.1 | 99.0 | 4.6 | 356.4 | 9 | Excellent |
| Comparative Example A1 | A6 | 80.0 | 81.3 | 88.2 | 95.4 | 98.7 | 1.3 | 362.3 | 16 | Poor |
| Comparative Example A2 | A7 | 63.4 | 65.1 | 68.1 | 74.1 | 81.0 | 1.7 | 286.6 | 18 | Poor |
| Comparative Example A3 | A6 | 66.9 | 68.5 | 71.3 | 79.6 | 85.3 | 1.6 | 303.1 | 19 | Poor |
| Comparative Example A4 | A8 | 72.1 | 72.2 | 77.4 | 86.3 | 95.6 | 0.1 | 331.4 | 23 | Poor |
| Comparative Example A5 | A9 | 50.8 | 54.3 | 59.6 | 64.0 | 72.5 | 3.5 | 246.9 | 20 | Poor |

TABLE 1-continued

| | Composition for Antiglare Layer | C(0.125) (%) | C(0.25) (%) | C(0.5) (%) | C(1.0) (%) | C(2.0) (%) | C(0.25) − C(0.125) (%) | Sum (%) of Four Transmission Image Sharpnesses | Glare Evaluation 1 | Glare Evaluation 2 |
|---|---|---|---|---|---|---|---|---|---|---|
| Comparative Example A6 | A10 | 55.4 | 58.2 | 62.2 | 67.2 | 74.6 | 2.8 | 259.4 | 20 | Poor |

TABLE 2

| | Haze (%) | | | Sm (mm) | θa (°) | Ra (μm) | Ry (μm) | Rz (μm) |
|---|---|---|---|---|---|---|---|---|
| | Total Haze | Internal Haze | Surface Haze | | | | | |
| Example A1 | 0.4 | 0.2 | 0.2 | 0.46 | 0.064 | 0.073 | 0.44 | 0.35 |
| Example A2 | 0.4 | 0.2 | 0.2 | 0.44 | 0.061 | 0.061 | 0.40 | 0.31 |
| Example A3 | 0.3 | 0.2 | 0.1 | 0.48 | 0.060 | 0.069 | 0.42 | 0.32 |
| Example A4 | 0.5 | 0.2 | 0.3 | 0.38 | 0.067 | 0.071 | 0.41 | 0.30 |
| Example A5 | 0.8 | 0.3 | 0.5 | 0.22 | 0.089 | 0.094 | 0.51 | 0.44 |
| Example A6 | 0.7 | 0.3 | 0.4 | 0.38 | 0.081 | 0.890 | 0.47 | 0.42 |
| Example A7 | 0.3 | 0.2 | 0.1 | 0.48 | 0.060 | 0.064 | 0.37 | 0.34 |
| Comparative Example A1 | 0.5 | 0.2 | 0.3 | 0.43 | 0.057 | 0.061 | 0.38 | 0.29 |
| Comparative Example A2 | 0.3 | 0.2 | 0.1 | 0.38 | 0.063 | 0.071 | 0.46 | 0.34 |
| Comparative Example A3 | 0.4 | 0.2 | 0.2 | 0.34 | 0.060 | 0.065 | 0.46 | 0.31 |
| Comparative Example A4 | 1.6 | 0.3 | 1.3 | 0.22 | 0.160 | 0.083 | 0.65 | 0.49 |
| Comparative Example A5 | 0.7 | 0.3 | 0.4 | 0.31 | 0.103 | 0.095 | 0.56 | 0.50 |
| Comparative Example A6 | 2.8 | 0.3 | 2.5 | 0.31 | 0.123 | 0.103 | 0.70 | 0.53 |

As shown in Table 1, in each of Comparative Examples A1 to A6, glare was not able to be suppressed because an antiglare film of which the difference between C (0.25) and C (0.125) was 2% or more and C (0.125) was 65% or more was not obtained.

In contrast, in each of Examples A1 to A7, glare was able to be suppressed even in an antiglare film of which the total haze value and internal haze were 0% or more and 5% or less, because the antiglare film of which the difference between C (0.25) and C (0.125) was 2% or more and C (0.125) was 65% or more was obtained.

It can be considered based on Table 1 that the sums of the transmission image sharpnesses of the antiglare films according to Examples A1 to A7 may be more than or less than the sums of the transmission image sharpnesses of the antiglare films according to Comparative Examples A1 to A6 in comparison between the sums of the transmission image sharpnesses of the antiglare films according to Examples A1 to A7 and the antiglare films according to Comparative Examples A1 to A6. It can be considered based on the results that it is impossible to evaluate an antiglare property based on the sum of transmission image sharpnesses.

Because the results of the glare evaluation 1 correspond to the results of the glare evaluation 2, it is considered that the measurement method used in the glare evaluation 1 is reliable.

Example B

<Preparation of Composition for Antiglare Layer>
First, each constituent was blended to obtain a composition for an antiglare layer to have the following composition:

(Composition B1 for Antiglare Layer)
  Silica fine particles (octylsilane-treated fumed silica, average primary particle diameter of 12 nm, manufactured by NIPPON AEROSIL CO., LTD.): 0.5 part by mass
  Silica fine particles (methylsilane-treated fumed silica, average primary particle diameter of 12 nm, manufactured by NIPPON AEROSIL CO., LTD.): 0.2 part by mass
  Pentaerythritol tetraacrylate (PETTA) (product name "PETA", manufactured by Daicel-Cytec Co., Ltd.): 50 parts by mass
  Urethane acrylate (product name "V-4000BA", manufactured by DIC Corporation): 50 parts by mass
  Polymerization initiator (IRGACURE 184, manufactured by BASF Japan Ltd.): 5 parts by mass
  Polyether-modified silicone (product name "TSF4460", manufactured by Momentive Performance Materials Inc.): 0.025 part by mass
  Toluene: 70 parts by mass
  Isopropyl alcohol: 40 parts by mass
  Cyclohexanone: 40 parts by mass (Composition B2 for Antiglare Layer)
  Silica fine particles (octylsilane-treated fumed silica, average primary particle diameter of 12 nm, manufactured by NIPPON AEROSIL CO., LTD.): 0.7 part by mass
  Pentaerythritol tetraacrylate (PETTA) (product name "PETA", manufactured by Daicel-Cytec Co., Ltd.): 50 parts by mass
  Urethane acrylate (product name "V-4000BA", manufactured by DIC Corporation): 50 parts by mass
  Polymerization initiator (IRGACURE 184, manufactured by BASF Japan Ltd.): 5 parts by mass
  Polyether-modified silicone (product name "TSF4460", manufactured by Momentive Performance Materials Inc.): 0.025 part by mass
  Toluene: 70 parts by mass
  Isopropyl alcohol: 40 parts by mass
  Cyclohexanone: 40 parts by mass (Composition B3 for Antiglare Layer)
  Spherical acrylic/styrene copolymer beads (refractive index of 1.52, average primary particle diameter of 5 μm, manufactured by SEKISUI PLASTICS CO., Ltd.): 4 parts by mass
  Isocyanuric acid EO-modified diacrylate (product name "M-215", manufactured by Toagosei Co., Ltd.): 50 parts by mass
  PMMA resin (solvent drying type resin, molecular weight of 75,000, manufactured by MITSUBISHI RAYON CO., LTD.): 50 parts by mass
  Polymerization initiator (IRGACURE 184, manufactured by BASF Japan Ltd.): 3 parts by mass
  Polyether-modified silicone (product name "TSF4460", manufactured by Momentive Performance Materials Inc.): 0.025 part by mass Toluene: 70 parts by mass
Isopropyl alcohol: 40 parts by mass
Cyclohexanone: 40 parts by mass
(Composition B4 for Antiglare Layer)
(1) Composition for Undercoat Concavo-Convex Layer
  Spherical acrylic/styrene copolymer beads (refractive index of 1.52, average primary particle diameter of 5 μm, manufactured by SEKISUI PLASTICS CO., Ltd.): 8 parts by mass
  Pentaerythritol tetraacrylate (PETTA) (product name "PETA", manufactured by Daicel-Cytec Co., Ltd.): 50 parts by mass
  Urethane acrylate (product name "V-4000BA", manufactured by DIC Corporation): 50 parts by mass
  Polymerization initiator (IRGACURE 184, manufactured by BASF Japan Ltd.): 5 parts by mass
  Polyether-modified silicone (product name "TSF4460", manufactured by Momentive Performance Materials Inc.): 0.015 part by mass
  Toluene: 70 parts by mass
  Isopropyl alcohol: 40 parts by mass
  Cyclohexanone: 40 parts by mass
(2) Composition for Surface Adjustment Layer
  Pentaerythritol tetraacrylate (PETTA) (product name "PETA", manufactured by Daicel-Cytec Co., Ltd.): 50 parts by mass
  Urethane acrylate (product name "V-4000BA", manufactured by DIC Corporation): 50 parts by mass
  Polymerization initiator (IRGACURE 184, manufactured by BASF Japan Ltd.): 5 parts by mass
  Polyether-modified silicone (product name "TSF4460", manufactured by Momentive Performance Materials Inc.): 0.035 part by mass
  Toluene: 110 parts by mass
  Cyclohexanone: 40 parts by mass
(Composition B5 for Antiglare Layer)
  Silica fine particles (octylsilane-treated fumed silica, average primary particle diameter of 12 nm, manufactured by NIPPON AEROSIL CO., LTD.): 0.5 part by mass
  Silica fine particles (methylsilane-treated fumed silica, average primary particle diameter of 12 nm, manufactured by NIPPON AEROSIL CO., LTD.): 0.2 part by mass
  Pentaerythritol tetraacrylate (PETTA) (product name "PETA", manufactured by Daicel-Cytec Co., Ltd.): 50 parts by mass
  Urethane acrylate (product name "V-4000BA", manufactured by DIC Corporation): 50 parts by mass
  Polymerization initiator (IRGACURE 184, manufactured by BASF Japan Ltd.): 5 parts by mass
  Polyether-modified silicone (product name "TSF4460", manufactured by Momentive Performance Materials Inc.): 0.025 part by mass
  Toluene: 90 parts by mass
  Isopropyl alcohol: 40 parts by mass
  Cyclohexanone: 20 parts by mass
(Composition B6 for Antiglare Layer)
  Silica fine particles (octylsilane-treated fumed silica, average primary particle diameter of 12 nm, manufactured by NIPPON AEROSIL CO., LTD.): 0.7 part by mass
  Pentaerythritol tetraacrylate (PETTA) (product name "PETA", manufactured by Daicel-Cytec Co., Ltd.): 50 parts by mass
  Urethane acrylate (product name "V-4000BA", manufactured by DIC Corporation): 50 parts by mass
  Polymerization initiator (IRGACURE 184, manufactured by BASF Japan Ltd.): 5 parts by mass
  Polyether-modified silicone (product name "TSF4460", manufactured by Momentive Performance Materials Inc.): 0.025 part by mass
  Toluene: 90 parts by mass
  Isopropyl alcohol: 40 parts by mass
  Cyclohexanone: 20 parts by mass
(Composition B7 for Antiglare Layer)
(1) Composition for Undercoat Concavo-Convex Layer
  Spherical acrylic/styrene copolymer beads (refractive index of 1.52, average primary particle diameter 5 μm, manufactured by SEKISUI PLASTICS CO., Ltd.): 12 parts by mass
  Pentaerythritol tetraacrylate (PETTA) (product name "PETA", manufactured by Daicel-Cytec Co., Ltd.): 50 parts by mass
  Urethane acrylate (product name "V-4000BA", manufactured by DIC Corporation): 50 parts by mass
  Polymerization initiator (IRGACURE 184, manufactured by BASF Japan Ltd.): 5 parts by mass
  Polyether-modified silicone (product name "TSF4460", manufactured by Momentive Performance Materials Inc.): 0.015 part by mass
  Toluene: 70 parts by mass
  Isopropyl alcohol: 40 parts by mass
  Cyclohexanone: 40 parts by mass
(2) Composition for Surface Adjustment Layer
  Pentaerythritol tetraacrylate (PETTA) (product name "PETA", manufactured by Daicel-Cytec Co., Ltd.): 50 parts by mass
  Urethane acrylate (product name "V-4000BA", manufactured by DIC Corporation): 50 parts by mass
  Polymerization initiator (IRGACURE 184, manufactured by BASF Japan Ltd.): 5 parts by mass
  Polyether-modified silicone (product name "TSF4460", manufactured by Momentive Performance Materials Inc.): 0.035 part by mass
  Toluene: 110 parts by mass
  Cyclohexanone: 40 parts by mass <Preparation of Composition for Low-Refractive-Index Layer>

Each constituent was blended to obtain a composition for a low-refractive-index layer to have the following composition.

(Composition B for Low-Refractive-Index Layer)
  Hollow silica fine particles (solid content of the hollow silica fine particle: 20% by mass, solution: methyl isobutyl ketone, average particle diameter: 50 nm): 40 parts by mass
  Pentaerythritol triacrylate (PETA) (product name: PETIA, manufactured by Daicel-Cytec Co., Ltd.): 10 parts by mass
  Polymerization initiator (IRGACURE 127; manufactured by BASF Japan Ltd.): 0.35 part by mass
  Modified silicone oil (X22164E, manufactured by Shin-Etsu Chemical Co., Ltd.): 0.5 part by mass
  Methyl isobutyl ketone (MIBK): 320 parts by mass
  Propylene glycol monomethyl ether acetate (PGMEA): 161 parts by mass Example B1

A triacetylcellulose resin film (TD60UL, manufactured by FUJIFILM Corporation) with a thickness of 60 μm as a light transmissive substrate was prepared, and the composition B1 for an antiglare layer was applied to one surface of the triacetylcellulose resin film to form a coating film. Then, a solvent in the coating film was evaporated by circulating dry air at 50° C. to the formed coating film at a flow rate of 0.5 m/s for 15 seconds and thereafter further circulating dry air at 70° C. at a flow rate of 10 m/s for 30 seconds to dry the coating film, and an antiglare layer of 4 μm in thickness (when cured) was formed to produce an antiglare film according to Example B1 by irradiating the coating film with ultraviolet light under nitrogen atmosphere (oxygen concentration of 200 ppm or less) so that the integrated amount of the light was 100 mJ/cm$^2$ to cure the coating film.

Example B2

In Example B2, an antiglare film was produced in the same manner as in Example B1 except that the composition B2 for an antiglare layer was used instead of the composition B1 for an antiglare layer.

Example B3

In Example B3, an antiglare film was produced in the same manner as in Example B1 except that the composition B3 for an antiglare layer was used instead of the composition B1 for an antiglare layer.

Example B4

In Example B4, a triacetylcellulose resin film (TD60UL, manufactured by FUJIFILM Corporation) with a thickness of 60 μm as a light transmissive substrate was prepared, and the composition for an undercoat concavo-convex layer of the composition B4 for an antiglare layer was applied to one surface of the triacetylcellulose resin film to form a coating film. Then, a solvent in the coating film was evaporated by circulating dry air at 70° C. to the formed coating film at a flow rate of 1.0 m/s for 15 seconds and thereafter further circulating dry air at 70° C. at a flow rate of 10 m/s for 30 seconds to dry the coating film, and an undercoat concavo-convex layer of 3 μm in thickness (when cured) was formed by irradiating the coating film with ultraviolet light under nitrogen atmosphere (oxygen concentration of 200 ppm or less) so that the integrated amount of the light was 50 mJ/cm$^2$ to cure the coating film. Furthermore, the composition for a surface adjustment layer of the composition B4 for an antiglare layer was applied to the undercoat concavo-convex layer to form a coating film, a solvent in the coating film was evaporated by circulating dry air at 70° C. at a flow rate of 1.0 m/s for 15 seconds and thereafter further circulating dry air at 70° C. at a flow rate of 10 m/s for 30 seconds to dry the coating film, and a surface adjustment layer was formed by irradiating the coating film with ultraviolet light under nitrogen atmosphere (oxygen concentration of 200 ppm or less) so that the integrated amount of the light was 100 mJ/cm$^2$ to cure the coating film. An antiglare layer was formed so that the total thickness of the undercoat concavo-convex layer and the surface adjustment layer was 6 μm (when cured), to produce an antiglare film according to Example B4.

Example B5

In Example B5, an antiglare layer was formed on a triacetylcellulose resin film in the same manner as in Example B1 except that the integrated amount of ultraviolet light was 50 mJ/cm$^2$. Then, the composition for a low-refractive-index layer was applied to a surface of the anti-glare layer so that the film thickness thereof was 0.1 μm after drying (40° C.×1 min), and irradiated with ultraviolet light at an integrated amount of the light of 100 mJ/cm$^2$ under nitrogen atmosphere (oxygen concentration of 200 ppm or less), to cure the composition, and a low-refractive-index layer was formed to produce an optical film according to Example B5.

Comparative Example B1

In Comparative Example B1, an antiglare film was produced in the same manner as in Example B1 except that dry air at 70° C. was circulated for 15 seconds at a flow rate of 4.0 m/s, and thereafter, dry air at 70° C. was further circulated for 30 seconds at a flow rate of 10 m/s, as drying conditions, using the composition B5 for an antiglare layer instead of the composition B1 for an antiglare layer.

Comparative Example B2

In Comparative Example B2, an antiglare film was produced in the same manner as in Example B1 except that dry air at 70° C. was circulated for 15 seconds at a flow rate of 2.0 m/s, and thereafter, dry air at 70° C. was further circulated for 30 seconds at a flow rate of 10 m/s, as drying conditions, using the composition B6 for an antiglare layer instead of the composition B1 for an antiglare layer.

Comparative Example B3

In Comparative Example B3, an antiglare film was produced in the same manner as in Example B4 except that the composition B7 for an antiglare layer was used instead of the composition B4 for an antiglare layer.

<Measurement of Ra (100) and Ra (100-1000)>

Arithmetic mean roughness Ra (100) was measured at a long wavelength cutoff wavelength of 100 μm on a surface (a surface of an antiglare layer in the absence of a low-refractive-index layer or a surface of a low-refractive-index layer in the presence of the low-refractive-index layer) of each of the antiglare films obtained in Examples B1 to B5 and Comparative Examples B1 to B3. Arithmetic mean roughness Ra (100-1000) was measured at a short wavelength cutoff wavelength of 100 μm and a long wavelength cutoff wavelength of 1000 μm.

A glass plate was affixed through a transparent pressure sensitive adhesive to a surface opposite to a surface, on which the antiglare layer was formed, of each of the antiglare films obtained in Examples B1 to B5 and Comparative Examples B1 to B3, to make a sample, and the surface geometry of the antiglare film was measured and analyzed using a white light interference microscope (New View 6300, manufactured by Zygo Corporation) under the following conditions. As analysis software, Advanced Texture Application of MetroPro ver 8.3.2 was used.

[Measurement Conditions]
Objective lens: 2.5 times
Zoom: 2 times
Number of data points: 992×992 points
Resolution (spacing per point): 2.2 μm
[Analysis Conditions]
Removed: None
High FFT Filter: Fixed
Low FFT Filter: Fixed
High Filter Wavelength: 100 μm
Low Filter Wavelength: 1000 μm Filters at cutoff values of 100 μm and 1000 μm are set on the above conditions. Remove spikes: on Spike Height (×RMS): 2.5

Spike-like noises can be removed on the above conditions.

Then, Three Band Map was displayed with the above-described analysis software (MetroPro ver 8.3.2-Advanced Texture Application). Ra in "High Band" of the display screen corresponds to Ra (100), while Ra in "Mid Band" corresponds to Ra (100-1000).

<Glare Evaluation (1)>

A glass plate (having a thickness of 3 mm) was affixed, with a transparent adhesive, to a surface, on which an antiglare layer is not formed, of each of the antiglare films obtained in Examples B1 to B5 and Comparative Examples B1 to B3. Furthermore, a glass surface, to which the antiglare film was not affixed, of the glass plate and a glass surface, on which a matrix was not formed, of a black matrix of 350 ppi (having a glass thickness of 0.7 mm) were affixed to each other with water. A white surface light source (LIGHTBOX manufactured by HAKUBA, average luminance of 1000 cd/m$^2$) was disposed in a place closer to the black matrix, to allow a sample obtained in such a manner to artificially generate glare. The glare was photographed with a CCD camera (KP-M1, C-mount adaptor, extension tube (PK-11A, NIKON CORPORATION), camera lens (50 mm, F 1.4s, NIKKOR)) from a place closer to the antiglare film. The distance between the CCD camera and the antiglare film was set at 250 mm, and the CCD camera was regulated to be focused on the antiglare film. An image obtained by photographing with the CCD camera was captured into a personal computer and analyzed with image processing software (ImagePro Plus ver. 6.2; manufactured by Media Cybernetics) as described below. First, an evaluation spot of 200×160 pixels was selected from the captured image, and the evaluation spot was converted into 16-bit gray scale. Then, a low-pass filter was selected from the highlighting tab of a filter command, and filtering was performed under conditions of 3×3, the number of times of 3, and a strength of 10, whereby components derived from a black matrix pattern were removed. Then, flattening was selected, and shading compensation was performed under conditions of background: dark and an object width of 10. Then, contrast: 96 and brightness: 48 were set in a contrast enhancement command, to perform contrast enhancement. The obtained image was converted into 8-bit gray scale, in which the dispersion of the values of 150×110 pixels was calculated as a standard deviation value for each pixel, to thereby convert glare into a number. It may be considered that the less value into which the glare was converted means less glare.

<Glare Evaluation (2)>

The glare of each of the antiglare films obtained in Examples B1 to B5 and Comparative Examples B1 to B3 was evaluated as described below. A light box (white surface light source) with a luminance of 1500 cd/m$^2$, black matrix glass of 350 ppi, and the antiglare film were allowed to be in the state of being stacked in the order mentioned from the bottom, and 15 subjects performed visual evaluation at a distance of around 30 cm from various angles from side to side and up and down. Whether or not they were annoyed by glare was determined and evaluated based on the following criteria:

Excellent: 13 or more subjects answer that it is favorable;
Good: 10 to 12 subjects answered that it is favorable;
Fair: 7 to 9 subjects answer that it is favorable; and
Poor: 6 or less subjects answer that it is favorable.

It can be considered that "fair" means that glare is not at an annoying level.

<Antireflection Property>

A black acrylic plate for preventing back surface reflection was affixed through a transparent pressure sensitive adhesive to a surface opposite to a surface, on which the antiglare layer was formed, of the triacetylcellulose substrate of each of the antiglare films obtained in Examples B1 to B5 and Comparative Examples B1 to B3, to make a sample. The antireflection property of the sample was evaluated by visual observation by 15 subjects under a bright room environment based on the following criteria. The "antireflection property" of a sample on which an image having a blurred contour was reflected was evaluated as favorable.

Good: 10 or more subjects answer that it is favorable.
Poor: 9 or less subjects answer that it is favorable.

<Measurement of Total Haze, Internal Haze, and Surface Haze>

The total haze, internal haze, and surface haze of each of the antiglare films obtained in Examples B1 to B5 and Comparative Examples B1 to B3 described above were measured as described below. First, the total haze value of the antiglare film was measured according to JIS K7136 using a haze meter (HM-150, manufactured by MURAKAMI COLOR RESEARCH LABORATORY). Then, a triacetylcellulose substrate (TD60UL, manufactured by FUJIFILM Corporation) was affixed to the surface of the antiglare layer via a transparent optical adhesive layer. As a result, the concavo-convex geometry of the concavo-convex surface of the antiglare layer was deformed, whereby the surface of the antiglare film became flat. In this state, the internal haze value was determined by measuring a haze value according to JIS K7136 using the haze meter (HM-150, manufactured by MURAKAMI COLOR RESEARCH LABORATORY). The surface haze value was determined by subtracting the internal haze value from the total haze value.

<Measurement of Sm, θa, Ry, and Rz>

Sm, θa, Ra, Ry, and Rz were measured on a surface (a surface of an antiglare layer in the absence of a low-refractive-index layer or a surface of a low-refractive-index layer in the presence of the low-refractive-index layer) of each of the antiglare films obtained in Examples B1 to B5 and Comparative Examples B1 to B3. The definitions of Sm, Ra, Ry, and Rz should comply with JIS B0601-1994, and θa should comply with the instruction manual (revised on Jul. 20, 1995) of a surface roughness measuring instrument: SE-3400, manufactured by Kosaka Laboratory Ltd.

Specifically, Sm, θa, Ry, and Rz were measured using a surface roughness measuring instrument (model number: SE-3400, manufactured by Kosaka Laboratory Ltd.) under the following measurement conditions:

1) Tracer in Surface Roughness Detector (trade name: SE2555N (standard 2 μm), manufactured by Kosaka Laboratory Ltd.)

Radius of curvature in tip: 2 μm, apex angle: 90 degrees, material: diamond

2) Measurement Conditions for Surface Roughness Measuring Instrument

Reference length (cutoff value λc of roughness curve): 2.5 mm

Evaluation length (reference length (cutoff value λc)×5): 12.5 mm

Feed speed of tracer: 0.5 mm/s

Preliminary length: (cutoff value λc)×2

Longitudinal magnification: 2000 times

Lateral magnification: 10 times

The results are listed in Table 3 and Table 4 below.

TABLE 3

|  | Composition for Antiglare Layer | Ra (100) [μm] | Ra (100-1000) [μm] | Ra (100)/Ra (100-1000) | Glare Evaluation 1 | Glare Evaluation 2 | Antireflection Property |
|---|---|---|---|---|---|---|---|
| Example B1 | B1 | 0.018 | 0.054 | 0.34 | 10 | Excellent | Good |
| Example B2 | B2 | 0.023 | 0.055 | 0.42 | 12 | Good | Good |
| Example B3 | B3 | 0.041 | 0.092 | 0.45 | 14 | Fair | Good |
| Example B4 | B4 | 0.032 | 0.084 | 0.38 | 13 | Good | Good |
| Example B5 | B1 | 0.016 | 0.051 | 0.31 | 9 | Excellent | Good |
| Comparative Example B1 | B5 | 0.017 | 0.036 | 0.47 | 14 | Fair | Poor |
| Comparative Example B2 | B6 | 0.024 | 0.046 | 0.53 | 19 | Poor | Good |
| Comparative Example B3 | B7 | 0.060 | 0.130 | 0.46 | 20 | Poor | Good |

TABLE 4

|  | Haze (%) | | | Sm (mm) | θa (°) | Ry (μm) | Rz (μm) |
|---|---|---|---|---|---|---|---|
|  | Total Haze | Internal Haze | Surface Haze | | | | |
| Example B1 | 0.4 | 0.2 | 0.2 | 0.46 | 0.061 | 0.43 | 0.34 |
| Example B2 | 0.5 | 0.2 | 0.3 | 0.41 | 0.072 | 0.49 | 0.39 |
| Example B3 | 0.8 | 0.3 | 0.5 | 0.20 | 0.089 | 0.86 | 0.73 |
| Example B4 | 0.7 | 0.3 | 0.4 | 0.35 | 0.080 | 0.79 | 0.68 |
| Example B5 | 0.3 | 0.2 | 0.1 | 0.49 | 0.059 | 0.42 | 0.31 |
| Comparative Example B1 | 0.5 | 0.3 | 0.2 | 0.53 | 0.063 | 0.51 | 0.42 |
| Comparative Example B2 | 0.5 | 0.2 | 0.3 | 0.38 | 0.065 | 0.56 | 0.42 |
| Comparative Example B3 | 0.8 | 0.3 | 0.5 | 0.31 | 0.123 | 1.01 | 0.70 |

As shown in Table 3, in each of Comparative Examples B1 to B3, glare was not able to be suppressed, or a favorable antireflection property was not able to be obtained, because an antiglare film with Ra (100)/Ra (100-1000) of 0.5 or less and Ra (100-1000) of 0.04 μm or more and 0.12 μm or less was not able to be obtained.

In contrast, in each of Examples B1 to B5, glare was able to be suppressed, and a favorable antireflection property was obtained even in an antiglare film of which the total haze value and internal haze were 0% or more and 5% or less, because the antiglare film with Ra (100)/Ra (100-1000) of 0.5 or less and Ra (100-1000) of 0.04 μm or more and 0.12 μm or less was able to be obtained.

Because the results of the glare evaluation 1 correspond to the results of the glare evaluation 2, it is considered that the measurement method used in the glare evaluation 1 is reliable.

REFERENCE SIGNS LIST 10, 50, 60, 100 Antiglare film
10A, 50A, 60A, 100A Surface
11, 51, 61, 101 Light transmissive substrate
11A, 51A, 61A, 101A Mixture region
12, 52, 62, 102 Antiglare layer
12A, 52A, 62A, 102A Concavo-convex surface
14, 64 Binder resin
15, 65 Fine particles
20 Polarizing plate
21 Polarizing element
30 Liquid crystal panel
40 Image display apparatus
53, 103 Functional layer

The invention claimed is:

1. An antiglare film, comprising: a light transmissive substrate; and an antiglare layer that is disposed on the light transmissive substrate and comprises a concavo-convex surface, wherein
a surface of the antiglare film is a concavo-convex surface;
the antiglare film has a total haze value of 0% or more and 5% or less; the antiglare film has an internal haze value of 0% or more and 5% or less; and
assuming that a transmission image sharpness of the antiglare film, measured using an optical comb with a width of 0.125 mm, is C (0.125), and that a transmission image sharpness of the antiglare film, measured using an optical comb with a width of 0.25 mm, is C (0.25), an expression (1) and an expression (2) described below are satisfied:

$$C(0.25)-C(0.125) \geq 2\% \quad (1); \text{ and}$$

$$C(0.125) \geq 65\% \quad (2);$$

the antiglare layer comprises therein a binder resin and inorganic oxide fine particles; and
the inorganic oxide fine particles have an average primary particle diameter of 1 nm or more and 100 nm or less.

2. The antiglare film according to claim 1, wherein the concavo-convex surface of the antiglare layer is the surface of the antiglare film.

3. The antiglare film according to claim 1, further comprising a functional layer disposed on the antiglare layer, a surface of the functional layer being the surface of the antiglare film.

4. The antiglare film according to claim 1, wherein the inorganic oxide fine particles are inorganic oxide fine particles of which surfaces are subjected to hydrophobization treatment.

5. The antiglare film according to claim 1, wherein the inorganic oxide fine particles form an aggregate in the antiglare layer; and the aggregate has an average particle diameter of 100 nm or more and 2.0 μm or less.

6. The antiglare film according to claim 1, wherein the antiglare film has a total haze value of 0% or more and 1% or less; and the antiglare film has an internal haze value of substantially 0%.

7. A polarizing plate, comprising:
the antiglare film according to claim 1; and
a polarizing element formed on a surface opposite to a surface, on which the antiglare layer is formed, of the light transmissive substrate of the antiglare film.

8. A liquid crystal display panel, comprising the polarizing plate according to claim 7.

9. An image display apparatus, comprising the polarizing plate according to claim 7, and comprising 3000 or more horizontal pixels.

10. A liquid crystal display panel, comprising the antiglare film according to claim 1.

11. An image display apparatus, comprising the antiglare film according to claim 1, and comprising 3000 or more horizontal pixels.

12. The antiglare film according to claim 1, wherein the antiglare layer does not comprise any particles other than the inorganic oxide fine particles.

13. The antiglare film according to claim 1, wherein concavities and convexities on the concavo-convex surface of the antiglare layer are formed due to only the inorganic oxide fine particles.

* * * * *